(12) United States Patent
Davidson et al.

(10) Patent No.: US 11,578,748 B2
(45) Date of Patent: Feb. 14, 2023

(54) FASTENER ASSEMBLY

(71) Applicant: 2738297 Ontario Inc., Amaranth (CA)

(72) Inventors: James Anthony Davidson, Macclesfield (GB); Paul Anthony Davidson, Victoria (CA)

(*) Notice: Subject to any disclaimer, the term of this patent is extended or adjusted under 35 U.S.C. 154(b) by 293 days.

(21) Appl. No.: 16/815,587

(22) Filed: Mar. 11, 2020

(65) Prior Publication Data

US 2020/0240455 A1 Jul. 30, 2020

Related U.S. Application Data

(62) Division of application No. 15/559,683, filed as application No. PCT/GB2016/050769 on Mar. 21, 2016, now Pat. No. 10,590,981.

(30) Foreign Application Priority Data

Mar. 19, 2015 (GB) .................................... 1504707
Oct. 3, 2015 (GB) .................................... 1517488

(51) Int. Cl.
  *F16B 21/16* (2006.01)
  *F16B 37/08* (2006.01)
  *F16B 2/06* (2006.01)

(52) U.S. Cl.
  CPC .......... *F16B 37/0857* (2013.01); *F16B 2/065* (2013.01); *F16B 37/0864* (2013.01)

(58) Field of Classification Search
  CPC .... F16B 37/0864; F16B 21/16; F16B 21/186; F16B 37/0878; Y10T 24/45005; Y10T 24/45002; Y10T 24/45864

USPC .......................................... 411/265–267, 270
See application file for complete search history.

(56) References Cited

U.S. PATENT DOCUMENTS

| | | | |
|---|---|---|---|
| 1,373,045 A * | 3/1921 | Bernhard | F16B 39/08 411/522 |
| 2,882,948 A | 4/1959 | Wallace | |
| 4,315,100 A | 2/1982 | Haslbeck et al. | |
| 4,369,012 A | 1/1983 | Baiet et al. | |
| 4,424,405 A | 1/1984 | Nattel | |
| 4,684,284 A * | 8/1987 | Bradley, Jr. | F16B 39/10 411/270 |
| 5,035,528 A | 7/1991 | Thau | |
| 5,074,731 A * | 12/1991 | Schneider | F16B 37/08 411/437 |

(Continued)

FOREIGN PATENT DOCUMENTS

| | | |
|---|---|---|
| EP | 0 855 526 A1 | 7/1998 |
| JP | 2000 018436 A | 1/2000 |
| WO | 2015/033098 A1 | 3/2015 |

*Primary Examiner* — Flemming Saether

(57) ABSTRACT

This fastener assembly includes a body, an elongated member and a split wedge. The body defines a cavity that converges. An access opening at a small end provides access to the cavity. The member has a circumferential external profile at one end. The split wedge has two or more wedge segments with a flexible hinge connecting each of the wedge segments. Each of the wedge segments has an internal profile. The member is inserted through the access opening into the cavity of the body, the wedge segments of the split wedge are positioned circumferentially around the member and then the split wedge is wedged in the cavity to maintain the external profile of the member engaged with the internal profile of the wedge segments of the split wedge.

3 Claims, 37 Drawing Sheets

(56) References Cited

U.S. PATENT DOCUMENTS

| | | | |
|---|---|---|---|
| 5,081,811 A | 1/1992 | Sasaki | |
| 5,098,241 A * | 3/1992 | Aldridge | F16L 37/092 285/321 |
| 5,902,085 A | 5/1999 | Yuta | |
| 6,062,784 A | 5/2000 | Wisser et al. | |
| 6,244,806 B1 * | 6/2001 | Kato | F16B 39/36 411/270 |
| 7,752,824 B2 * | 7/2010 | Brown | F16B 21/16 52/223.13 |
| 8,132,767 B2 | 3/2012 | Oh et al. | |
| 8,186,923 B2 | 5/2012 | Heide | |
| 8,231,318 B2 | 7/2012 | Pitsch et al. | |
| 8,434,725 B2 | 5/2013 | Oh et al. | |
| 8,998,155 B2 | 4/2015 | Oh et al. | |
| 9,637,893 B2 | 5/2017 | Lin et al. | |
| 9,841,043 B2 * | 12/2017 | Tally | H02G 3/263 |
| 2009/0297294 A1 | 12/2009 | Li et al. | |
| 2010/0108840 A1 | 5/2010 | Oh et al. | |
| 2016/0208959 A1 | 7/2016 | Davidson | |

* cited by examiner

FASTENER ASSEMBLY

CROSS-REFERENCE TO RELATED APPLICATIONS

This application claims the benefit of U.S. patent application Ser. No. 15/559,683, which has a 371(c) date of Sep. 19, 2017 and an international filing date of Mar. 21, 2016, and which claims priority to UK Patent Applications Nos. 1517488.1 (filed on Oct. 3, 2015) and 1504707.9 (filed on Mar. 19, 2015).

FIELD

There is described a fastener assembly that was developed as an alternative to other fasteners presently in use.

BACKGROUND

There will hereinafter be described an innovative fastener assembly, along with the manner in which the fastener assembly can be used in a number of described applications as an alternative to other fasteners presently in use, such as U.S. Pat. No. 8,132,767 (Oh et al) entitled "Quick Threaded Rod Locking Devices and Method".

An example of a previous attempt to develop an innovative fastener assembly is International Patent Application PCT/GB2014/052232 (Davidson) entitled "Improvements in and relating to Pipe Support Systems". U.S. Pat. No. 5,081,811 (Sasaki) discloses a split nut spring biased wedge locking fastener assembly. Patents identified in the International Search Report as also disclosing a split nut spring biased wedge locking fastener assemblies include EP 855,526 (Yuta et al), JP 2000/018436 (Kitamura), US 2010/108840 (Oh et al), and WO 2015/033098 (Davidson).

SUMMARY

There is provided a fastener assembly which includes a body, an elongated member and a split wedge. The body defines a cavity that converges from a relatively larger end to a relatively smaller end. The body has an access opening giving access to the cavity, which is positioned at the smaller end of the cavity. The member is capable of insertion through the access opening into the cavity. The member has a first end, a second end and a circumferential external profile at the first end. The split wedge has two or more wedge segments. Each of the wedge segments has a thick end, a thin end and an internal profile extending between the thick end and the thin end which is capable of engaging the external profile of the member. The split wedge has a flexible hinge that connects the thin end of the wedge segments. The member is secured to the body by inserting the first end of the member through the access opening into the cavity of the body, positioning the wedge segments of the split wedge circumferentially around the member and then wedging the split wedge in the cavity to maintain the external profile of the member engaged with the internal profile of the wedge segments of the split wedge.

In some applications, it is desirable to add a retainer/spacer as a securing element to prevent relative movement of the split wedge and the body when the split wedge is wedged in the cavity. This prevents unintentional release of the member.

There will now be described a number of applications in which fasteners are used, and the manner in which the described fastener is used in such applications. It will be appreciated, that the applications selected are for illustration only and are not exhaustive of all possible applications. In fact, the fastener assembly has such wide-ranging application that all possible applications could not possibly be described.

The fastener assembly, as described, has a number of advantages over the prior art, not the least of which is lower cost of components and time saving for either installation, subsequent removal or both.

BRIEF DESCRIPTION OF THE DRAWINGS

These and other features will become more apparent from the following description in which reference is made to the appended drawings, the drawings are for the purpose of illustration only and are not intended to be in any way limiting, wherein.

Figure 1A:
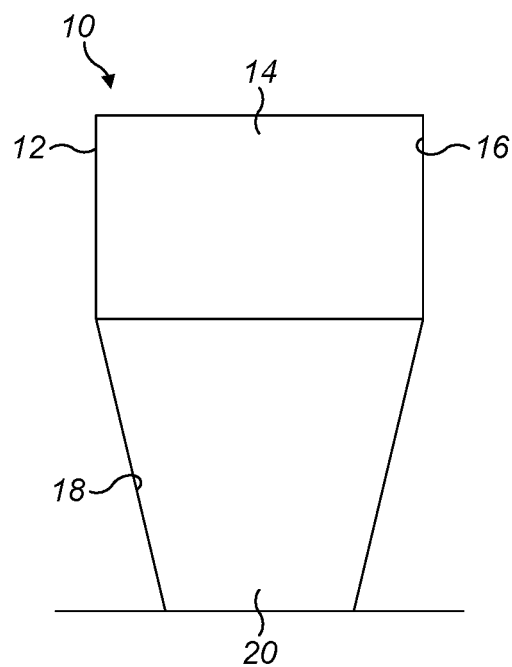
FIG. 1A through FIG. 1H are a series of side elevation views, in section, of the fastener assembly showing sequentially how to engage and then disengage the components.
Figure 1B:
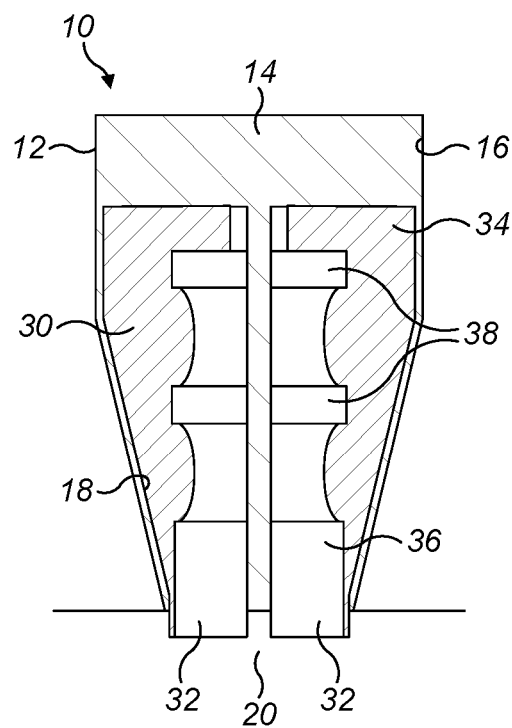
Figure 1C:
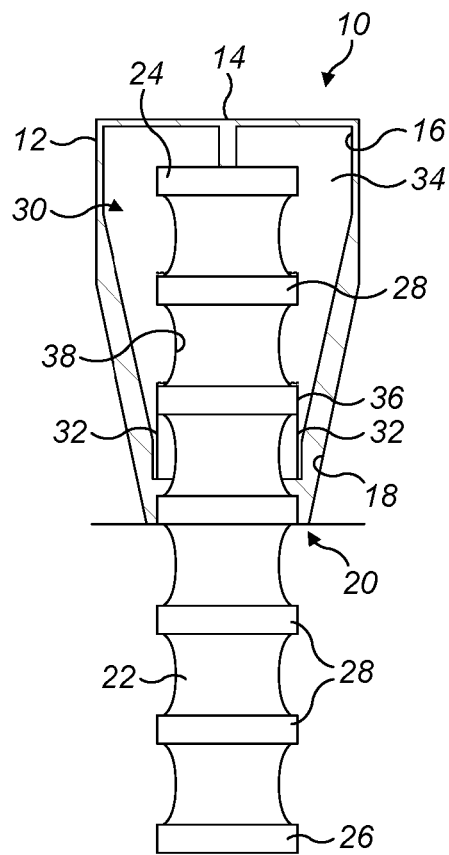
Figure 1D:
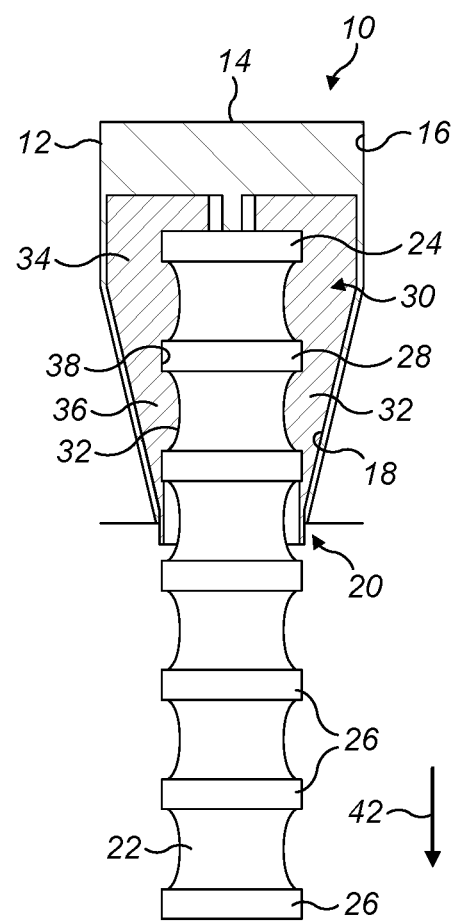
Figure 1E:
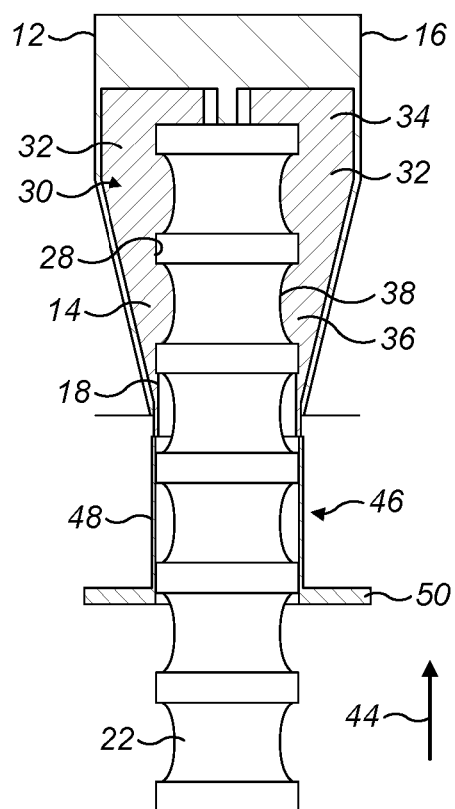
Figure 1F:
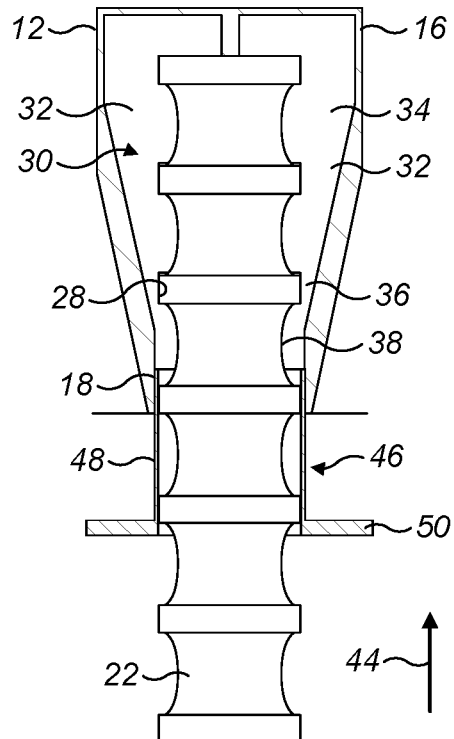
Figure 1G:
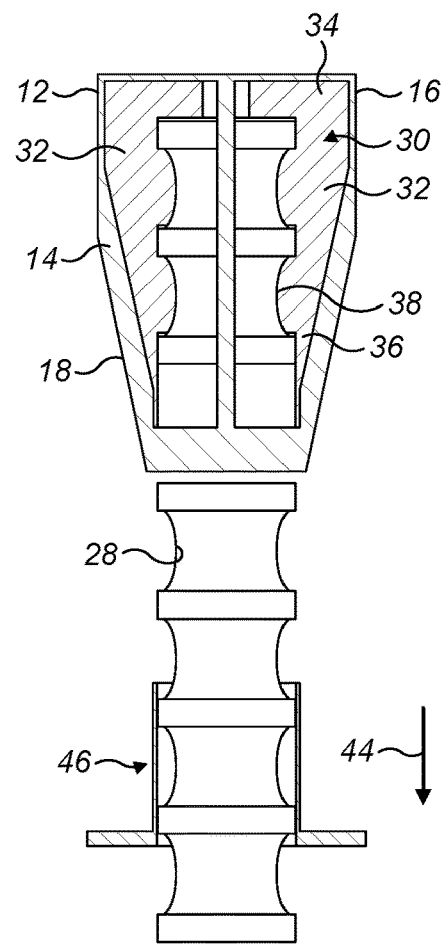
Figure 1H:
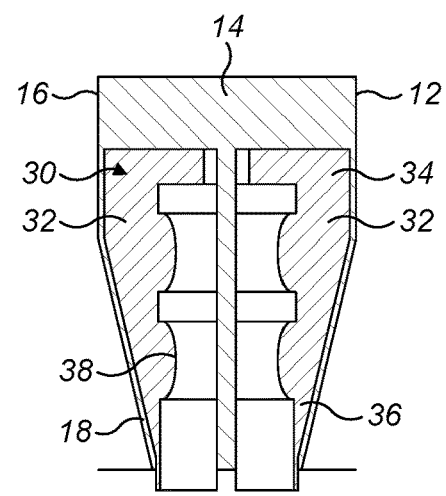

1A through FIG. 1H incorporated into a nut and bolt fastener show as securing a boat propellor.

Figure 17A:
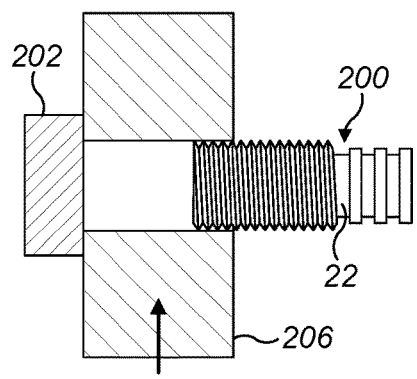
FIG. 17A through 17E are a series of sequential side elevation views, in section, of the fastener assembly of FIG.
Figure 17B:
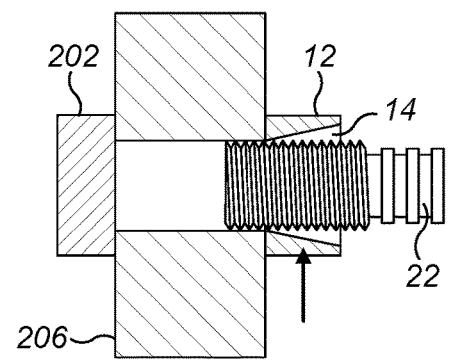
Figure 17C:
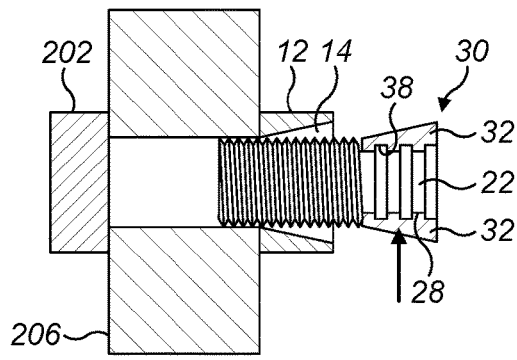
Figure 17D:
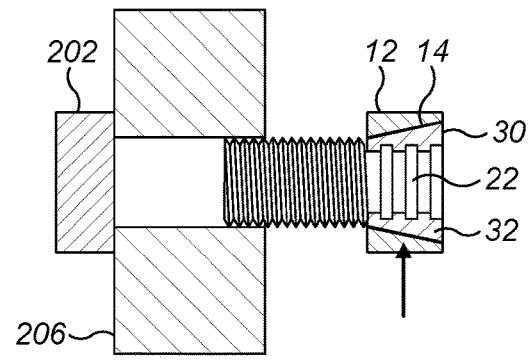
Figure 17E:
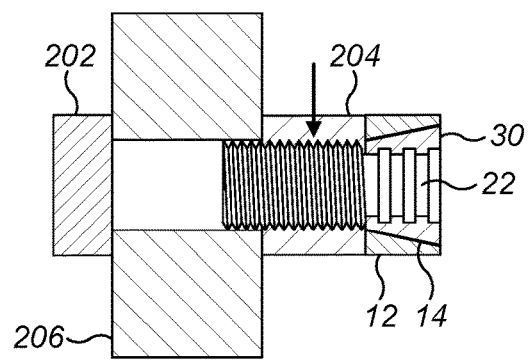
Figure 18:
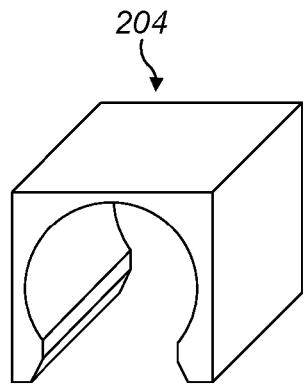

FIG. 18 is a perspective view of the retainer/spacer used in FIG. 17E.

Figure 19:
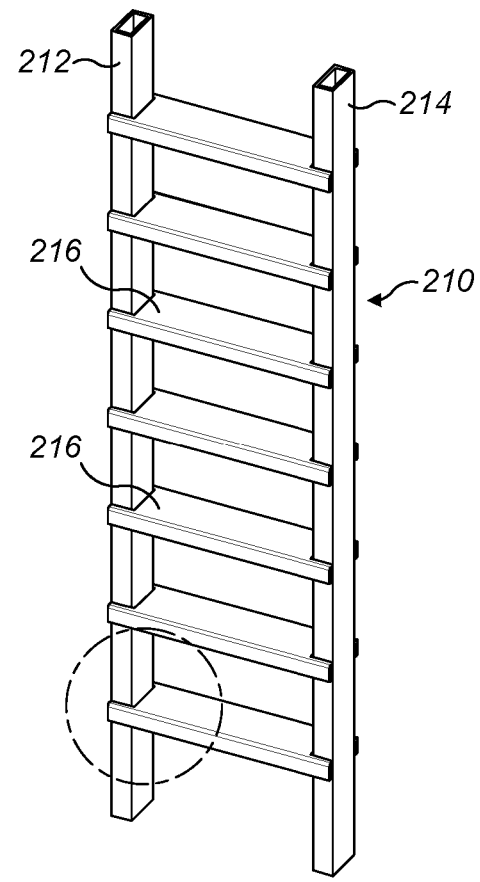

FIG. 19 is a front elevation view of the fastener assembly of FIG. 1A through FIG. 1H incorporated into a ladder.

Figure 20:
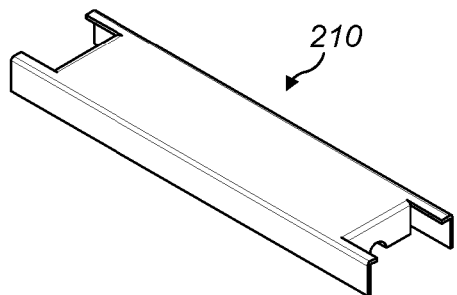

FIG. 20 is a perspective view of a rung from the ladder of FIG. 19.

Figure 21A:
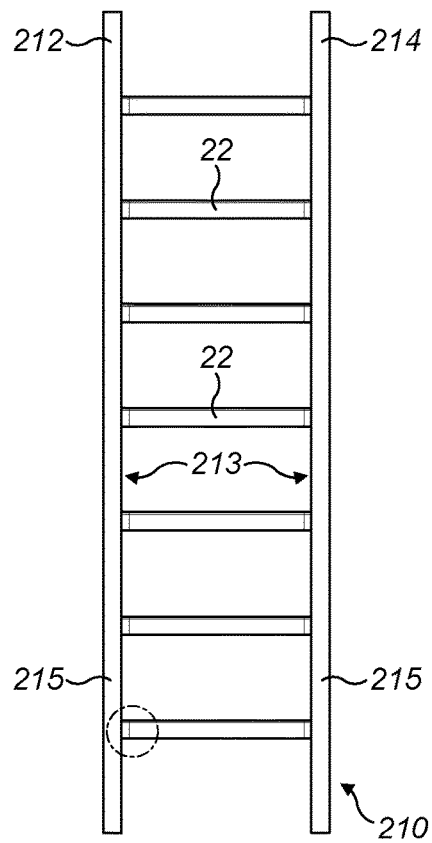

FIG. 21A is a front elevation view, in section, of the ladder of FIG. 19, with rungs removed.

Figure 21B:
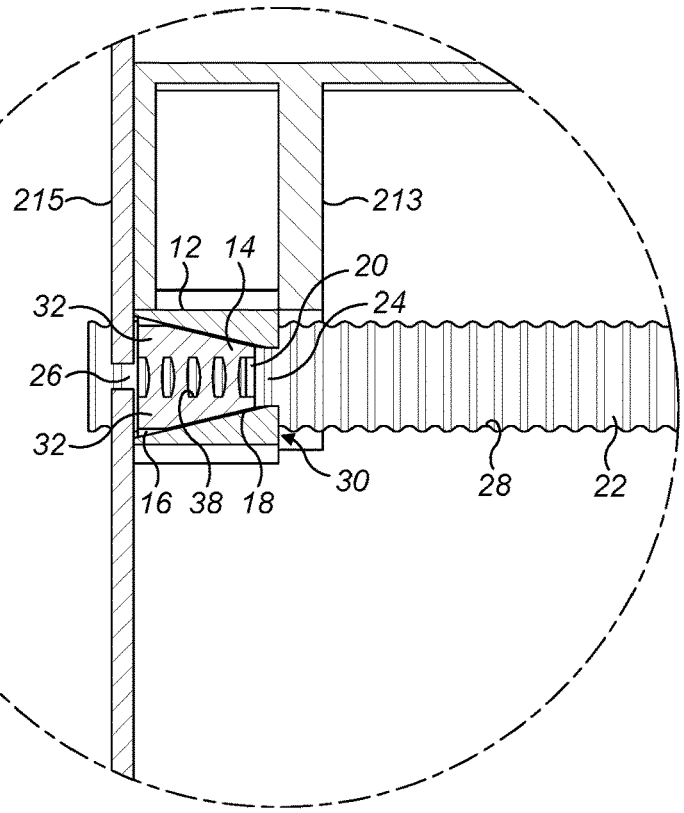

FIG. 21B is a detailed view taken from FIG. 19 and FIG. 21.

Figure 22:
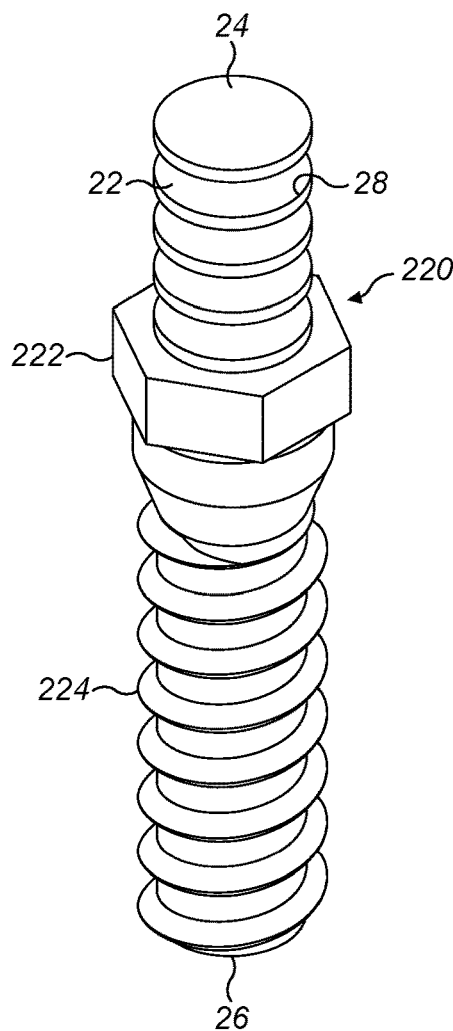

FIG. 22 is a perspective view of an alternative form of member for use as a rotatable fastener.

Figure 23:
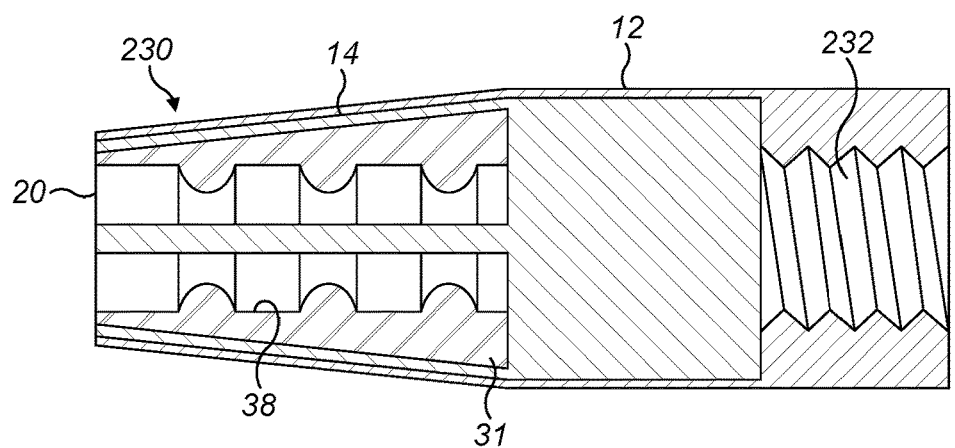

FIG. 23 is a side elevation view, in section, of a female threaded adaptor.

Figure 2:
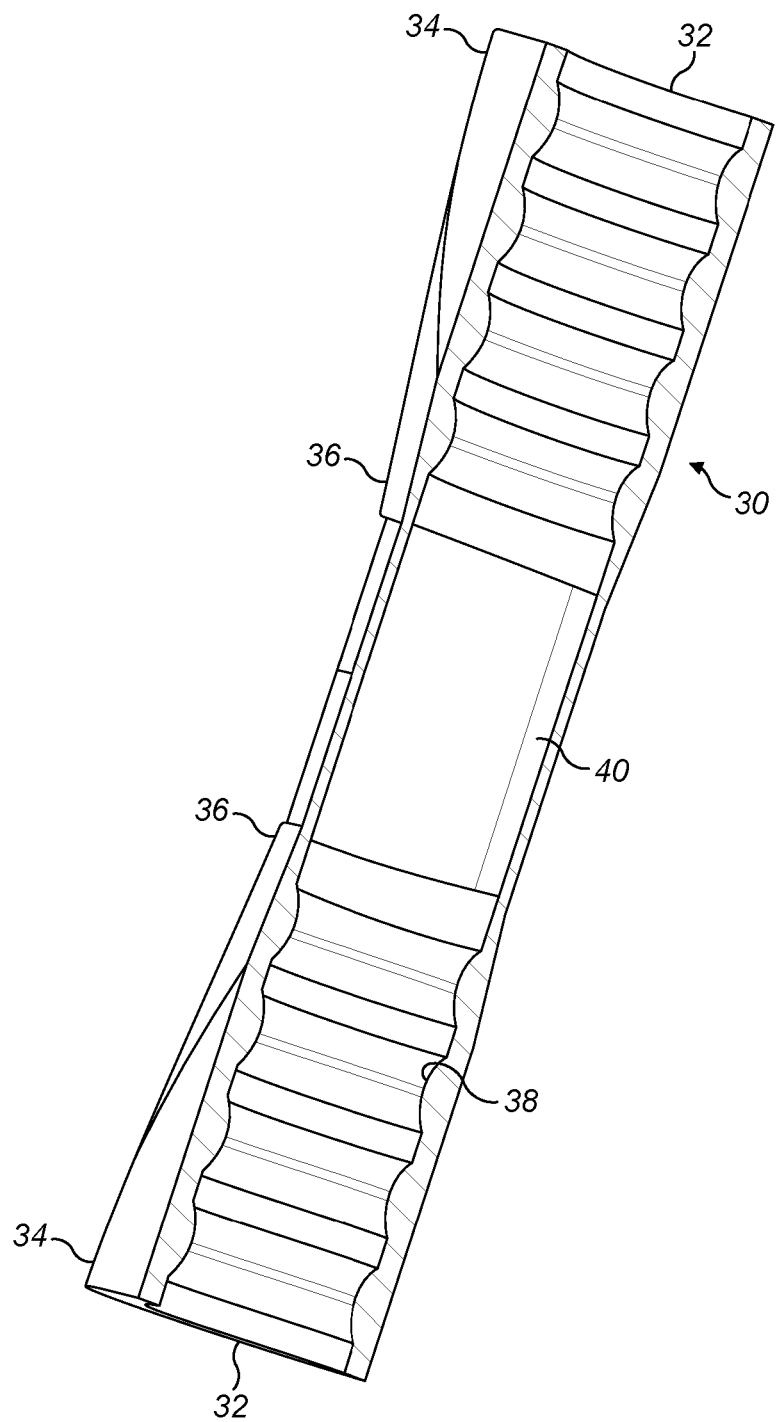
FIG. 2 is a perspective view of a split wedge used in FIG. 1B through FIG. 1H.
Figure 3:
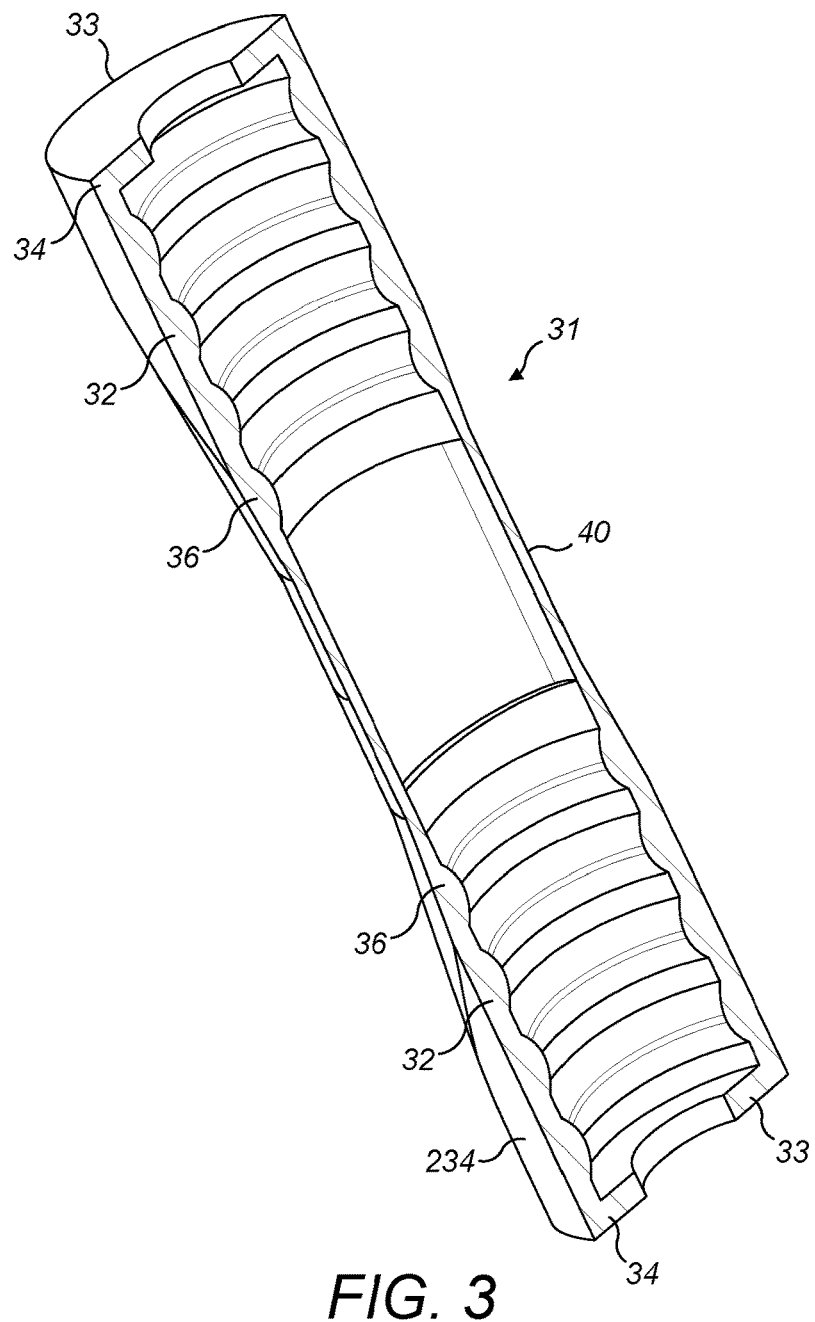
FIG. 3 is a perspective view of a first alternative split wedge configuration.
Figure 24:
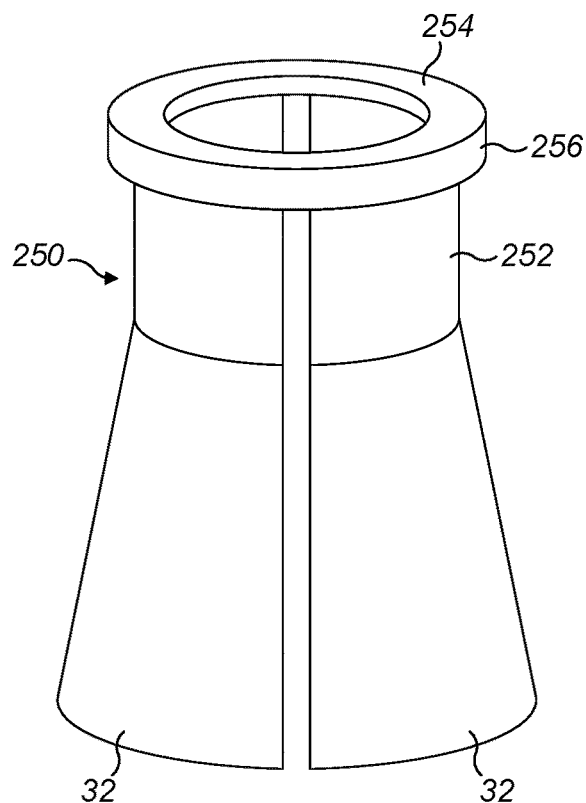

FIG. 24 is a perspective view of a split extension sleeve which forms an extension of the thin end of the split wedge illustrated in FIG. 2 and FIG. 3 to create a second alternative split wedge configuration.

FIG. 25A through 25I are a series of sequential side elevation views, in section, of the fastener assembly of FIG. 1A through FIG. 1H, with the split wedge modified by the addition of the split extension sleeve illustrated in FIG. 24, showing sequentially how to engage and then disengage the components.

Figure 26:
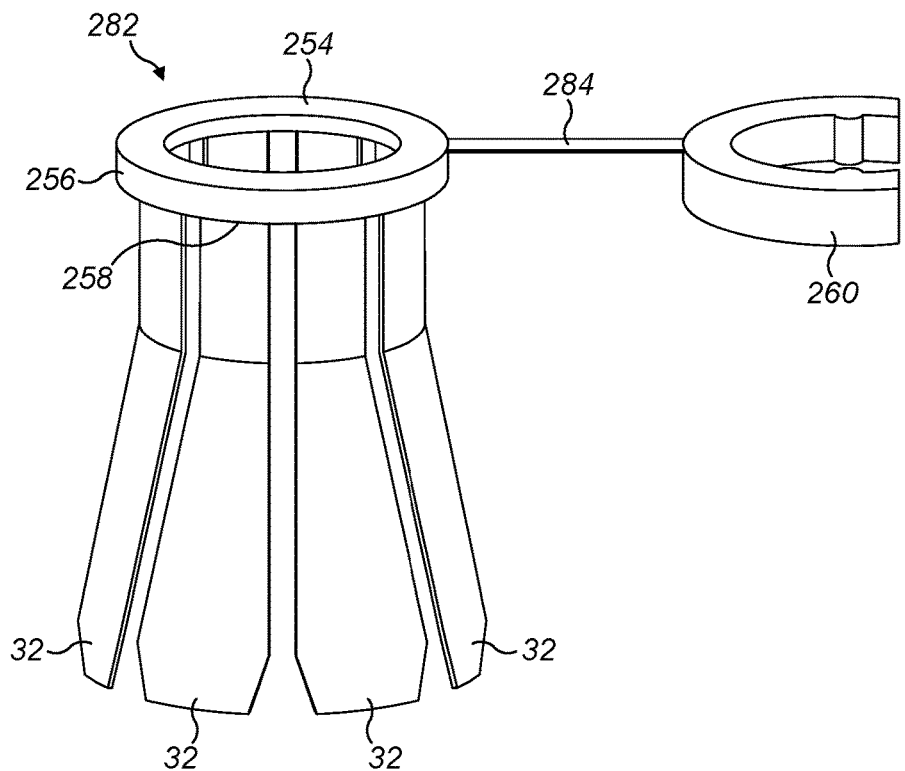

FIG. 26 is a perspective view of a split extension sleeve for the thin end of the split wedge, with retainer/spacer attached by an umbilical cord.

Figure 27:
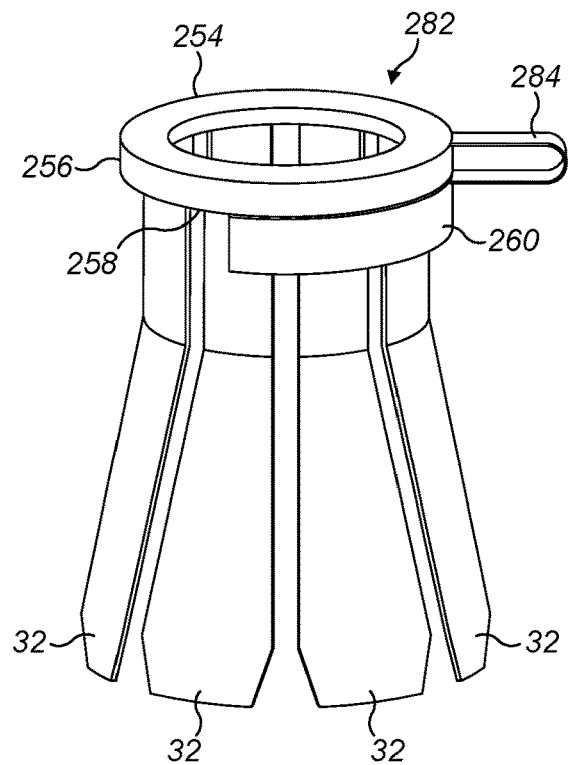

FIG. 27 is a perspective view of the split extension sleeve illustrated in FIG. 26, with retainer/spacer in an engaged position.

Figure 28:
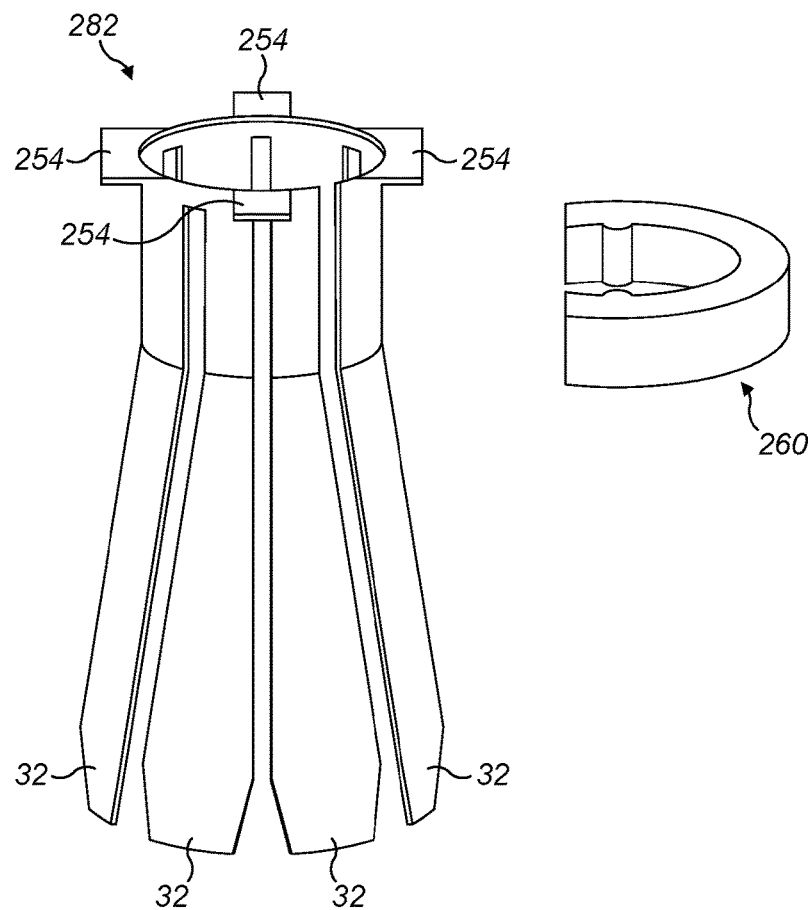

FIG. 28 is a perspective view of an alternative form of split extension sleeve for the thin end of the split wedge, with retainer/spacer.

FIG. 29A through 29E are a series of sequential side elevation views, in section, of the fastener assembly of FIG. 1A through FIG. 1H incorporated into a ball hitch.

Figure 30:
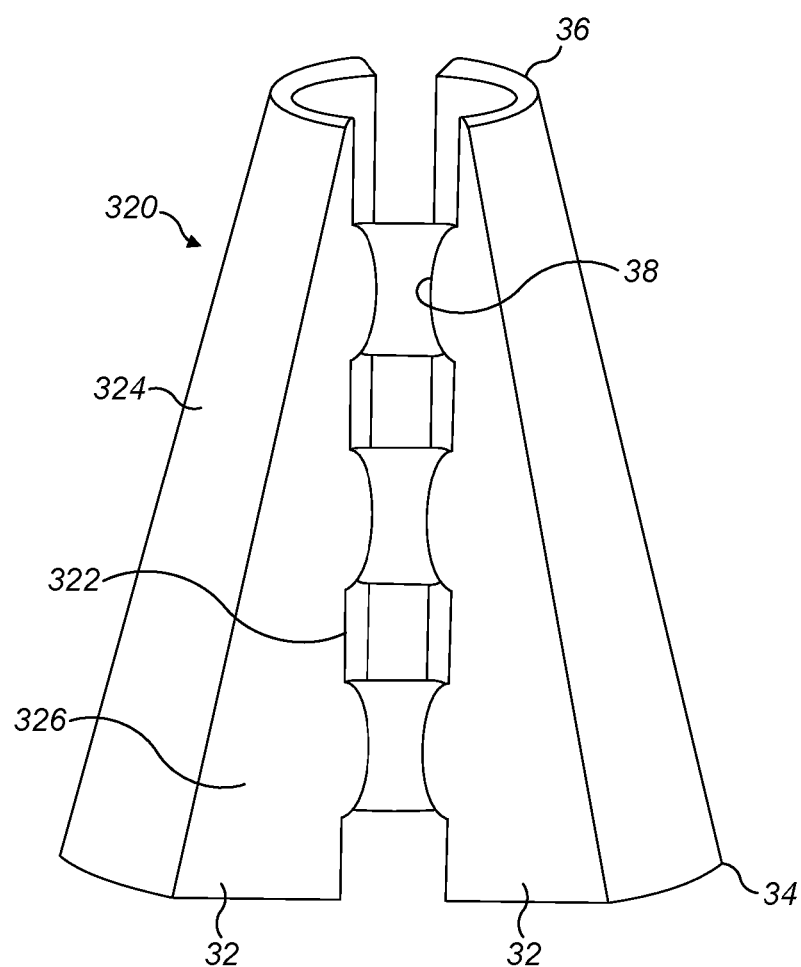

FIG. 30 is a perspective view of a third alternative split wedge configuration having a side hinge.

FIG. 31A through 31D are a series of sequential side elevation views, in section, of a fastener assembly with a fourth alternative split wedge configuration.

FIG. 32A through 32F are a series of sequential side elevation views, in section, of the fastener assembly of FIG. 1A through FIG. 1H incorporated into a beam clamp.

Figure 32A:
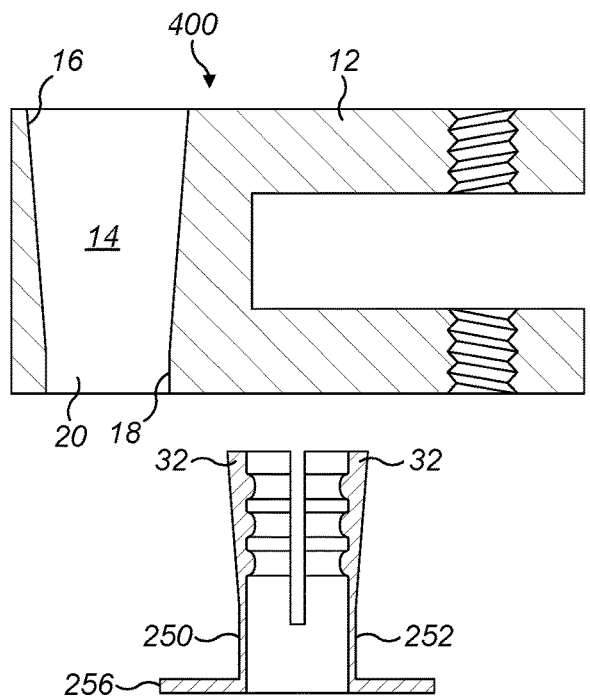
Figure 32B:
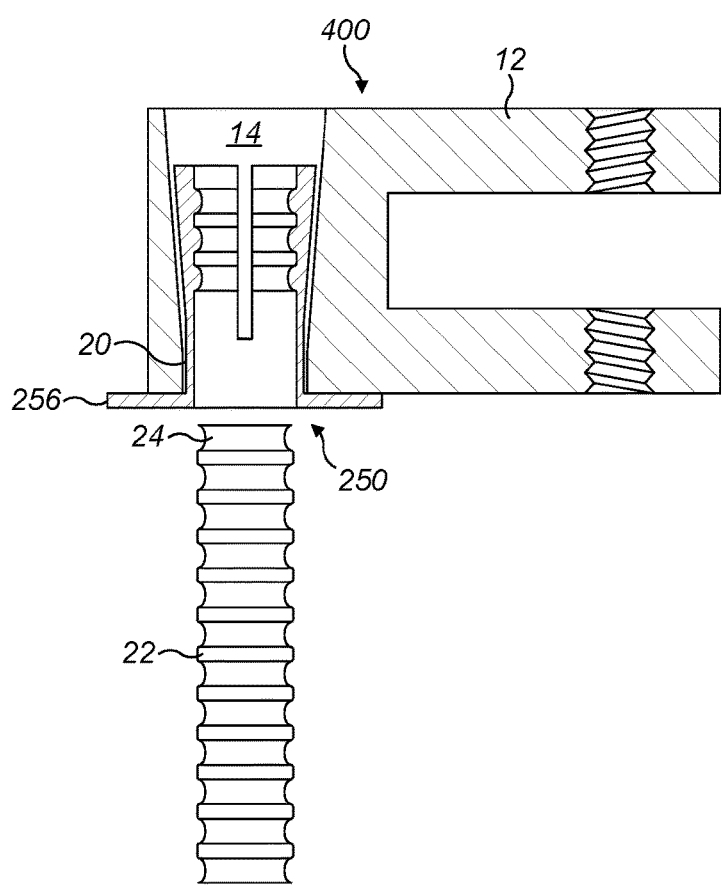
Figure 32C:
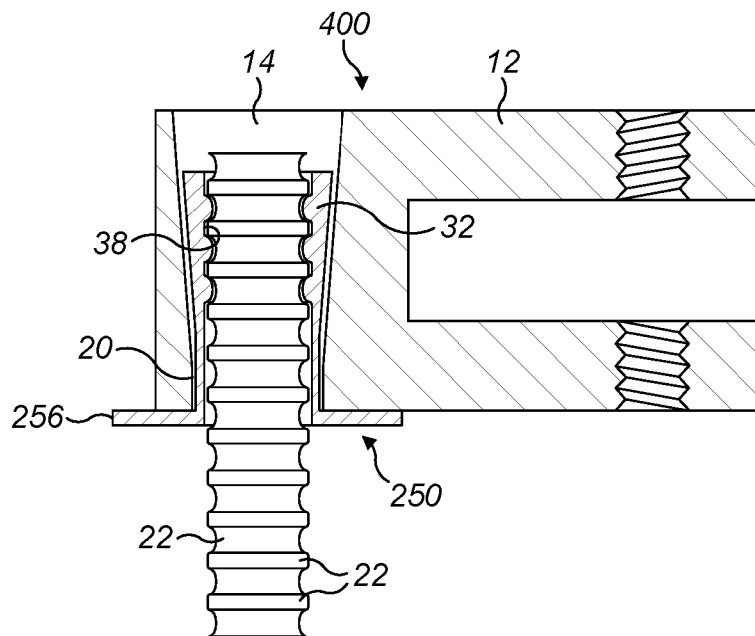
Figure 32D:
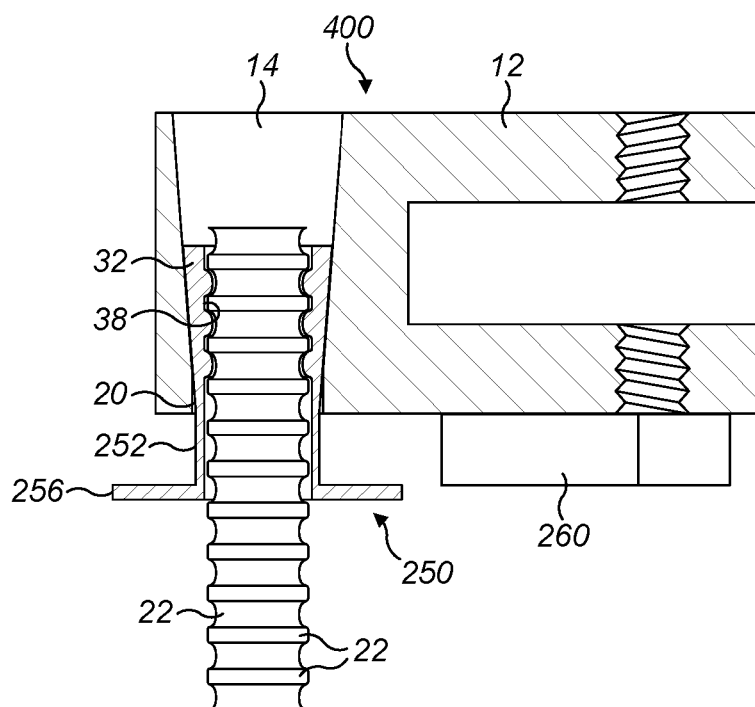
Figure 32E:
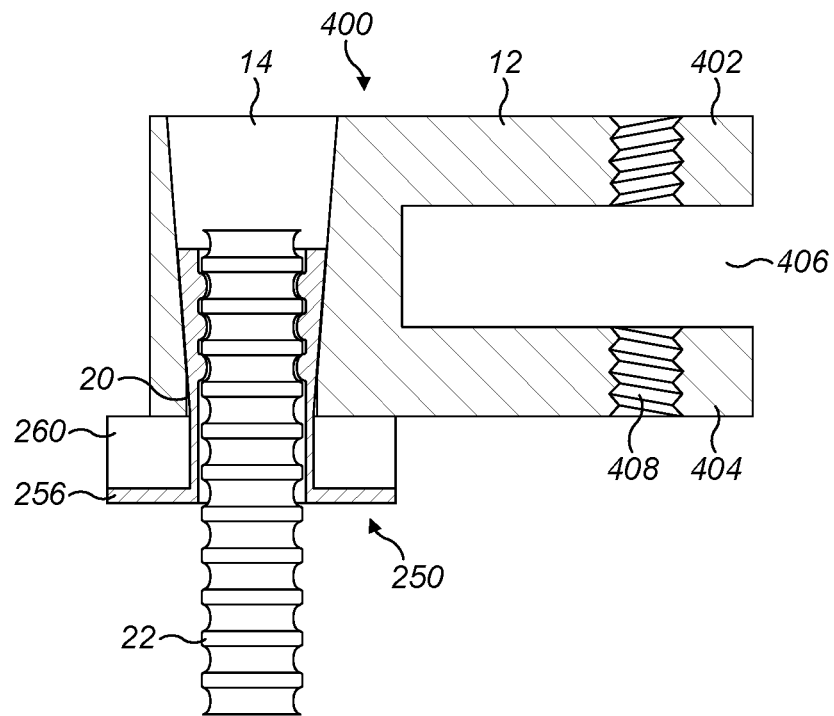
Figure 32F:
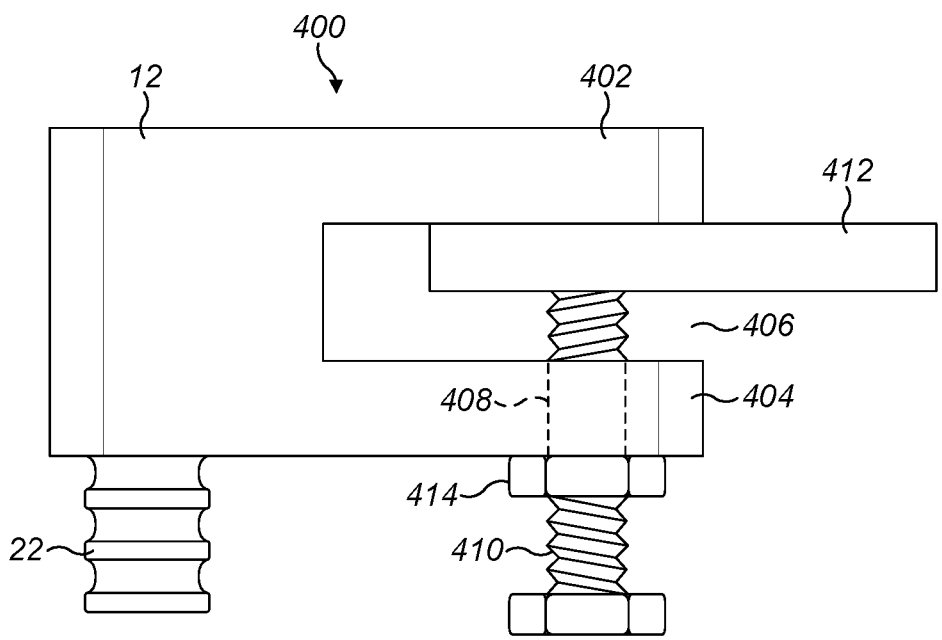
Figure 33:
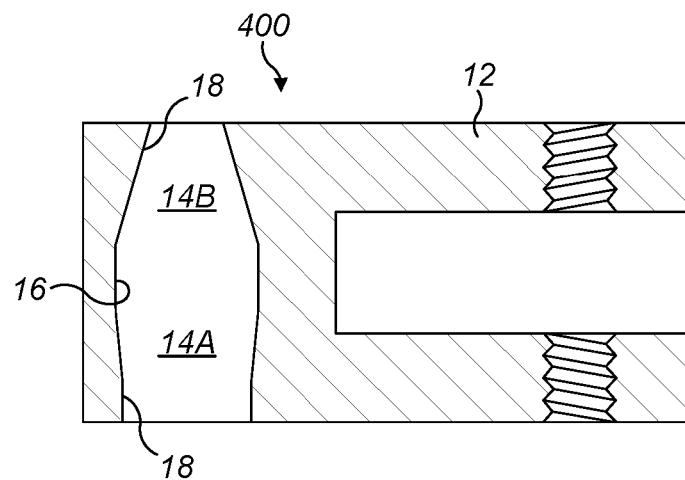

FIG. 33 is a side elevation view, in section, of an alternative body for the beam clamp of FIG. 32A through 32F.

Figure 34:
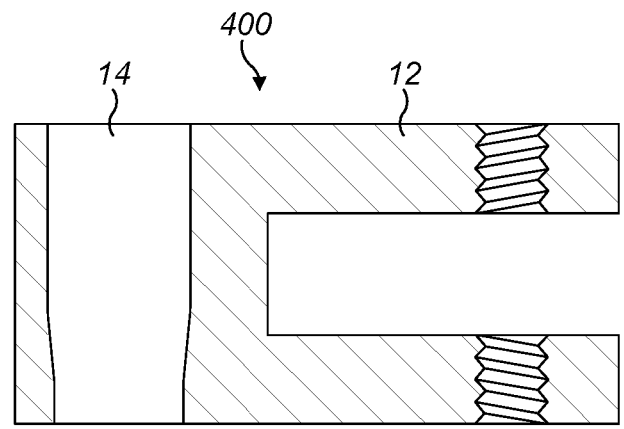
Figure 34:
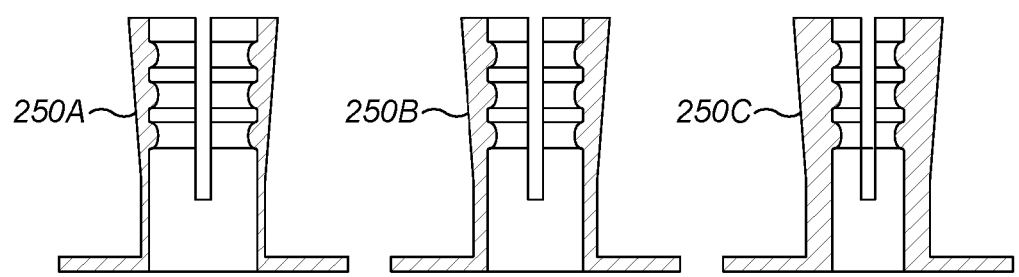

FIG. 34 is an exploded side elevation view, in section, of a kit containing multiple split wedges that accommodate members of varying diameter.

Figure 35A:
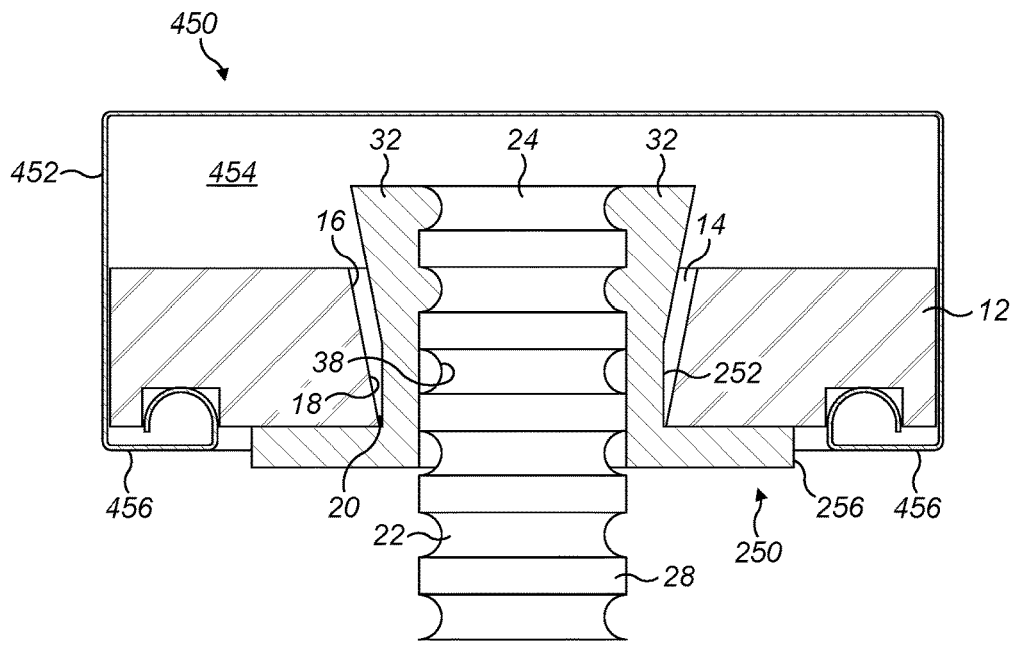
Figure 35B:
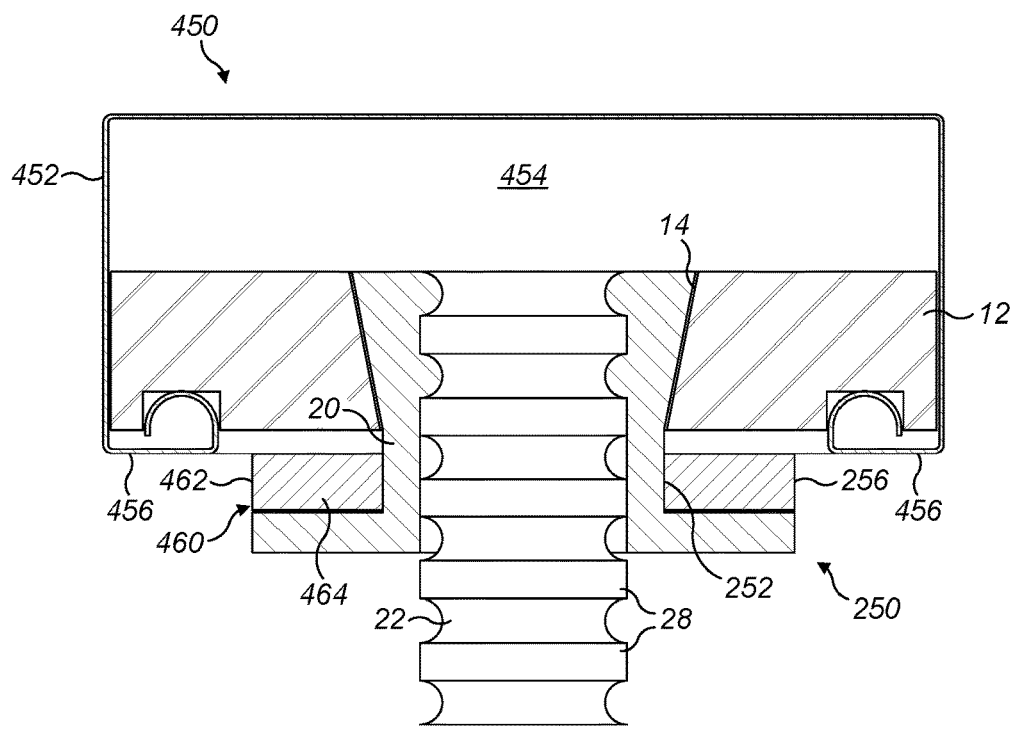
Figure 35C:
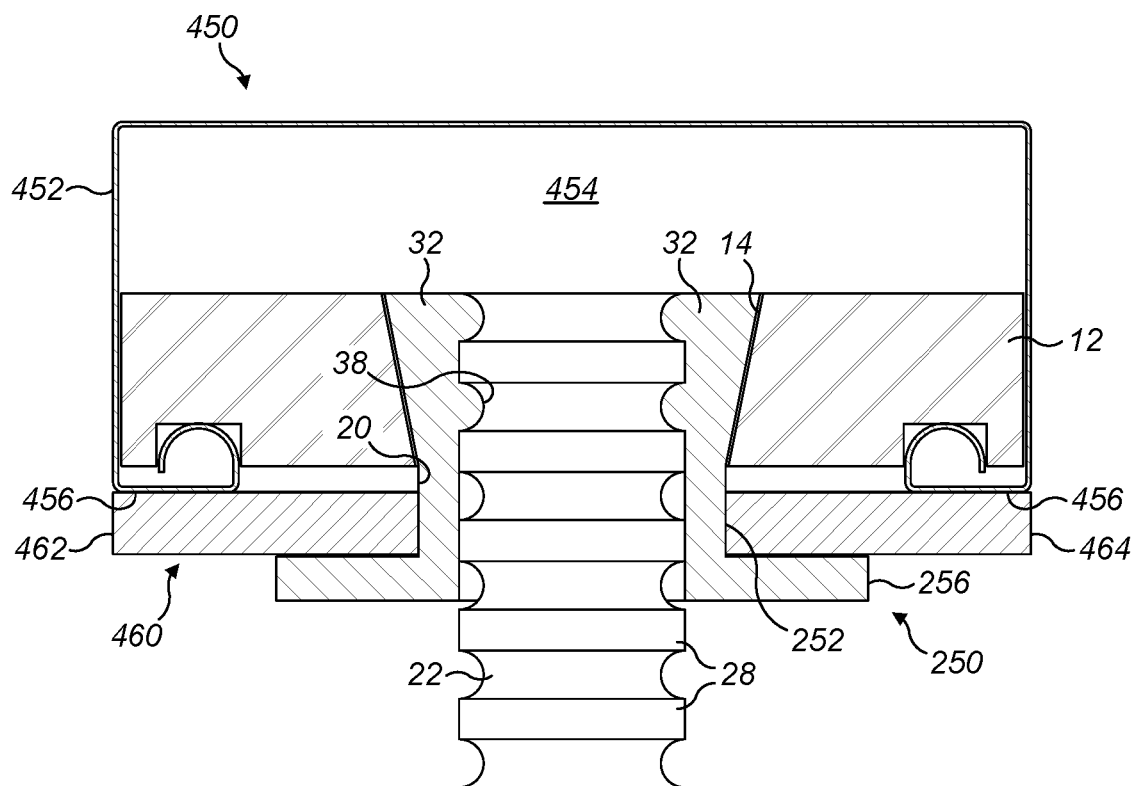

FIG. 35A through 35C are a series of sequential side elevation views, in section, of the fastener assembly of FIG. 1A through FIG. 1H incorporated into a rail system.

Figure 36:
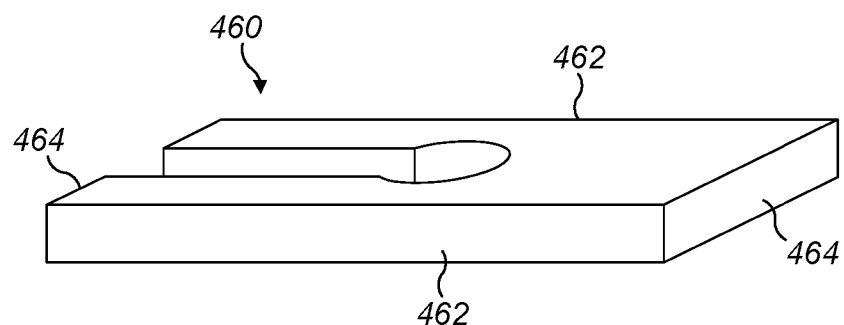

FIG. 36 is a perspective view of a retainer that is used with the rail system illustrated in FIG. 35A through 35C.

DETAILED DESCRIPTION

A fastener assembly generally identified by reference numeral 10, will now be described with reference to FIG. 1A through FIG. 1H and FIG. 2. A series of applications for fastener assembly 10, along with some variations, will then be described with reference to FIG. 3 through 31D.
Structure and Relationship of Parts:

Referring to FIG. 1A, fastener assembly 10 includes a body 12 defining a tapered cavity 14 that converges from a relatively larger end 16 to a relatively smaller end 18. In the illustrated embodiment cavity 14 is funnel shaped. It will be appreciated that other converging shapes may be used for cavity 14. Referring to FIG. 1A through FIG. 1H, body 12 has an access opening 20 positioned at smaller end 18 of cavity 14 that facilitates access to cavity 14. Referring to FIG. 1C through FIG. 1G, fastener assembly 10 also includes an elongated member 22 capable of insertion through access opening 20 into cavity 14. Member 22 has a first end 24, a second end 26 and a circumferential external profile 28. In the illustrations external profile 28 is circumferential ridges. It will be appreciated that, depending upon the application, external profile 28 could be castellated rod or a thread form (provided the thread form was sufficiently prominent). While external profile 28 can cover the entirety of member 22 it is required that external profile 28 at minimum cover first end 24, which is the working end.

Referring to FIG. 2, fastener assembly 10 finally includes a split wedge 30. Split wedge 30 has two or more wedge segments 32. The preferred configuration has two wedge segments 32. Each of wedge segments 32 has a thick end 34 and a thin end 36. An internal profile 38 extends between thick end 34 and thin end 36, which is capable of engaging external profile 28 of member 22. Split wedge 30 has a flexible hinge that connects thin end 36 of wedge segments 32. The preferred configuration consists of two parallel hinge bands 40. Referring to FIG. 1B and FIG. 1H, split wedge 30 is illustrated folded about hinge bands 40 and positioned within cavity 14 of body 12, with thin end 36 at smaller end 18 of cavity 14 and thick end 34 at larger end 16 of cavity 14.

Operation

Referring to FIG. 1C and FIG. 1D, member 22 is secured to body 12 by inserting first end 24 of member 22 through access opening 20 into cavity 14 of body 12. Wedge segments 32 of split wedge 30 are positioned circumferentially around member 22. Split wedge 30 is then wedged in cavity 14 to maintain external profile 28 of member 22 engaged with internal profile 38 of wedge segments 32 of split wedge 30. Split wedge 30 can usually be engaged by slowly pulling member 22 back toward access opening 20 as indicated by direction arrow 42. Please note that if member 22 is pulled back too rapidly, internal profile 38 of split wedge 30 may not have an opportunity to become engaged with external profile 28 of member 22, with the result that member 22 passes back through access opening 20. Hinge bands 40 maintain the relative positioning of wedge segments 32. As will hereinafter be further described with reference to specific applications, in many applications split wedge 30 is maintained engaged with member 22 by force of gravity.

Referring to FIG. 1E through FIG. 1H, when it is desired to disengage split wedge 30 from member 22, a force is exerted upon member 22, as indicated by direction arrow 44. This results in split wedge 30 being raised toward larger end 16 of cavity 14 where external profile 28 of member 22 can become disengaged from internal profile 38 of wedge segments 32 of split wedge 30. In most instances a manual force is sufficient, however, if split wedge 30 becomes "stuck" in cavity 14, a removal tool, generally indicated by reference numeral 46 may be used. Removal tool 46 consists of a sleeve 48 with a flange 50. Sleeve 48 slides over member 22 and is used to exert an upward force upon thin end 36 of split wedge 30. Flange 50 facilitates handling and also provides a striking surface for a hammer (not shown).

Applications and Variations

There will hereinafter be described a series of applications that incorporate fastener assembly 10. The reference numerals used above for fastener assembly 10 will remain the same, with only new elements being identified by further reference numerals.

Figure 5C:
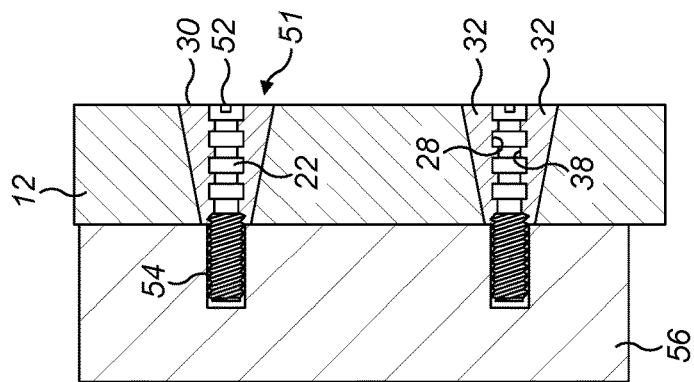
FIG. 5A through FIG. 5C are a series of sequential side elevation views, in section, of the fastener assembly of FIG. 1A through FIG. 1H incorporated into a screw fastener.
Figure 5B:
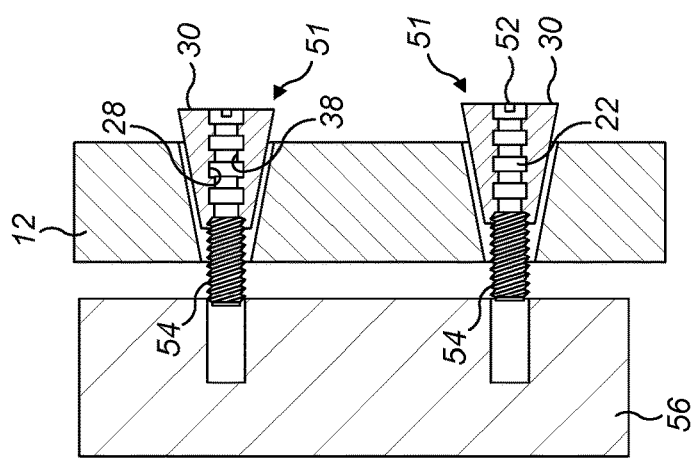
Figure 5A:
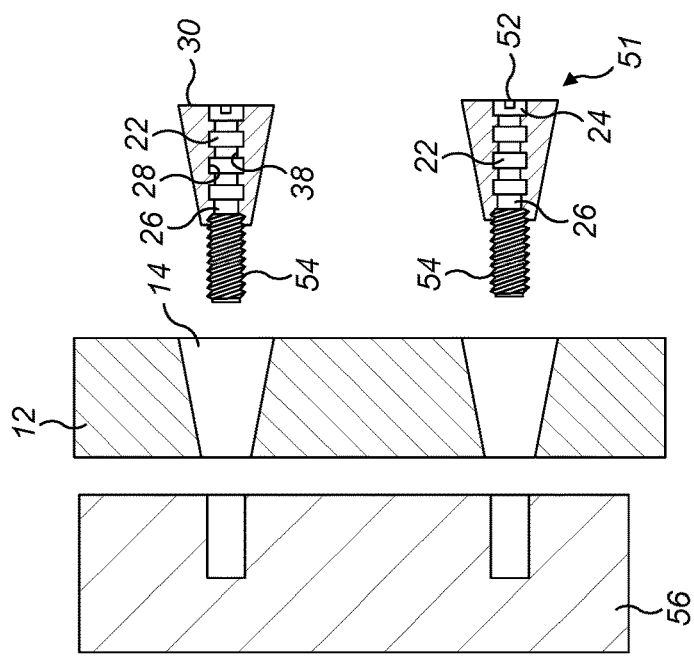

Referring to FIG. 5A through 5C, there is illustrated fastener assembly 10 incorporated into a screw fastener, generally identified by reference numeral 51. With screw fastener 51, member 22 is turned into a rotatable fastener by the addition of a drive head 52 for engaging a tool, such as a screw driver, at first end 24 and a circumferential helical screw profile 54 at second end 26. Body 12 has a cavity 14, as previously described. Depending upon the application, cavity 14 can be manufactured into body 12 or formed on site using a conical reamer. Helical screw profile 54 of member 22 is used to engage an object 56, illustrated as a wall. Object 56 into which helical screw profile 54 of screw fastener 51 is secured serves as a securing element to keep split wedge 30 wedged in cavity 14 with external profile 28 of member 22 engaged with internal profile 38 of wedge segments 32 of split wedge 30.

Figure 6:
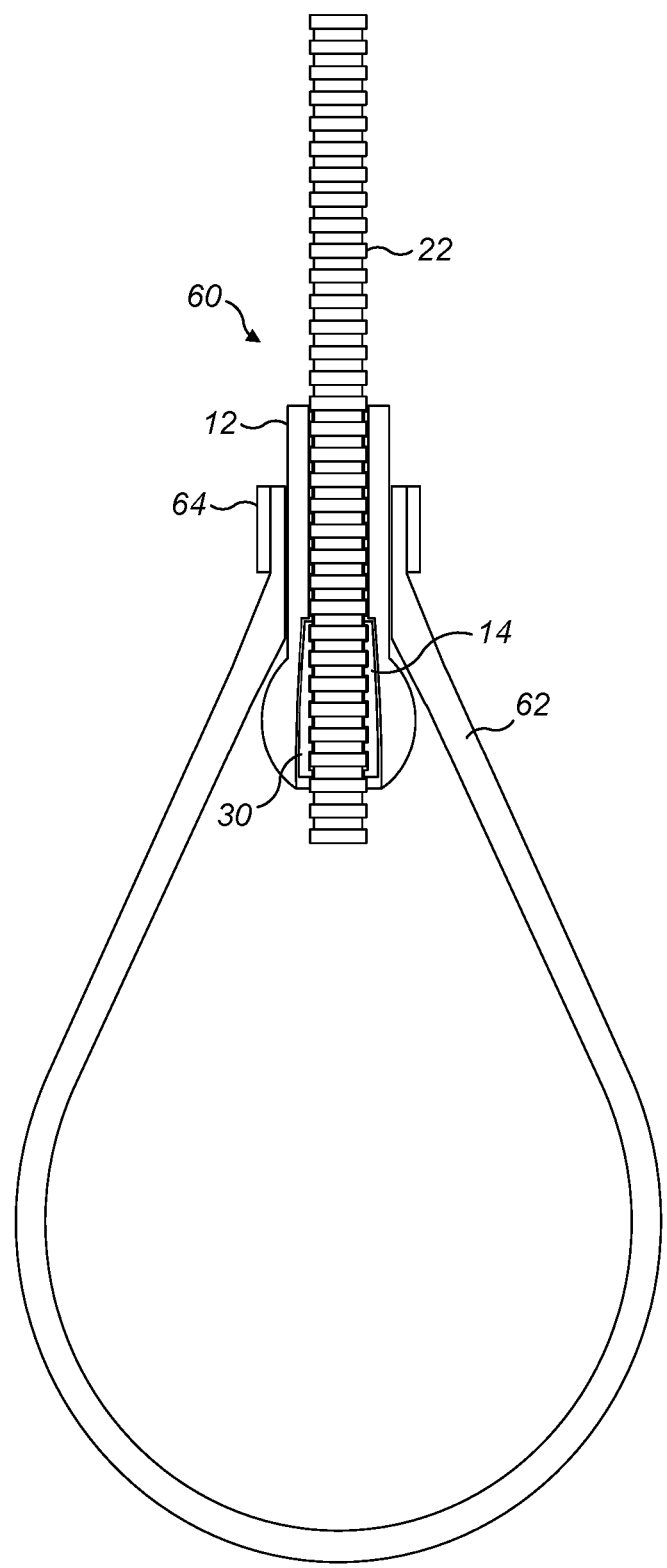
FIG. 6 is a side elevation view, in section, of the fastener assembly of the fastener assembly of FIG. 1A through FIG. 1H incorporated into a pipe support band.

Referring to FIG. 6, there is illustrated fastener assembly 10 incorporated into a pipe support band, generally identified by reference numeral 60. With pipe support band 60, a strap or band 62 is secured by a clamp 64 onto body 12. When a pipe is inserting placing a load upon band 62, body 12 is pulled downwardly into engagement with split wedge 30. In this way, gravity biases split wedge 30 into engagement with cavity 14, until the load is removed and a predetermined force is exerted to overcome the biasing force of gravity.

Figure 7:
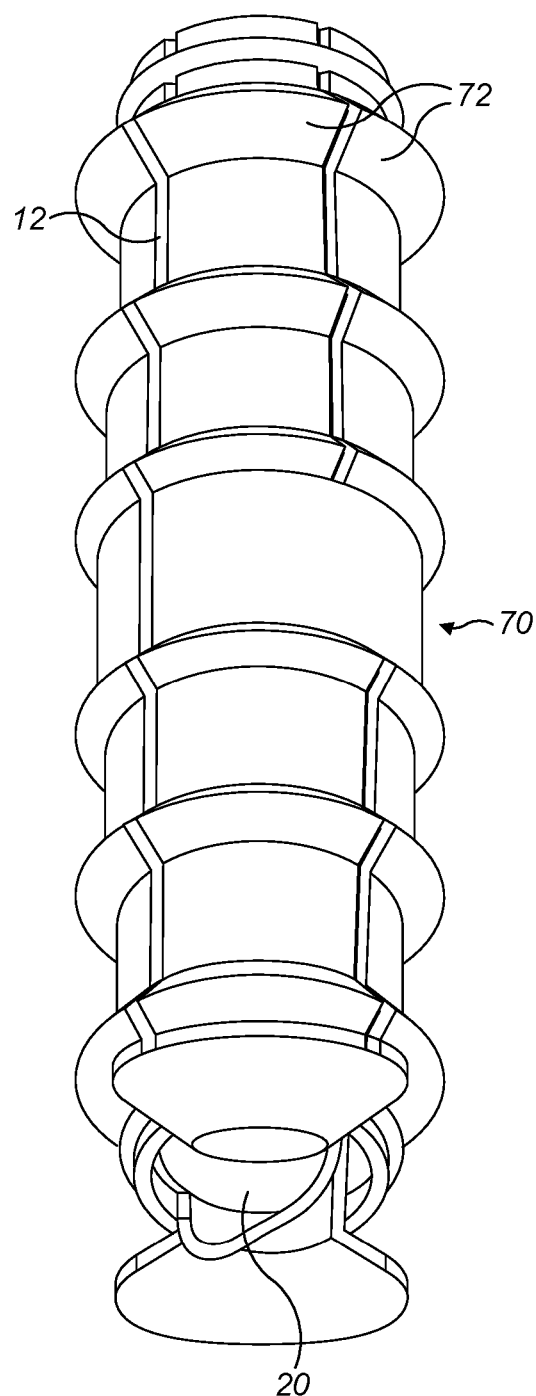
FIG. 7 is a perspective view of the fastener assembly of FIG. 1A through FIG. 1H incorporated into an anchor.
Figure 8A:
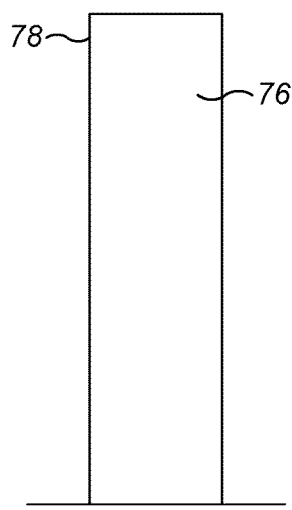
FIG. 8A through FIG. 8G are a series of sequential side elevation views, in section, showing sequentially how to install the anchor of FIG. 7.
Figure 8B:
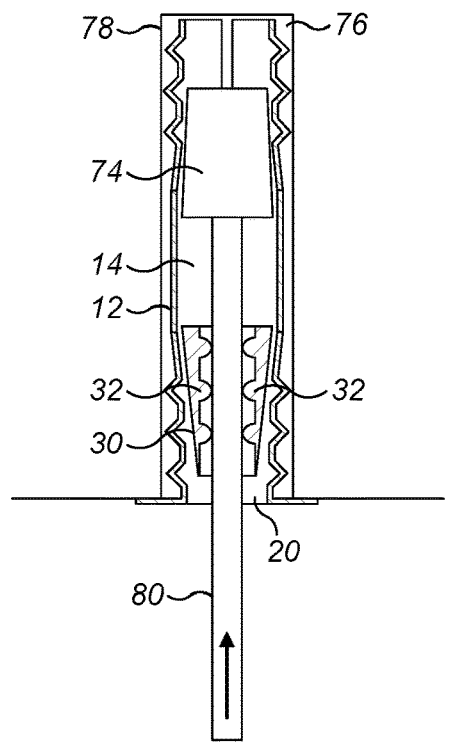
Figure 8C:
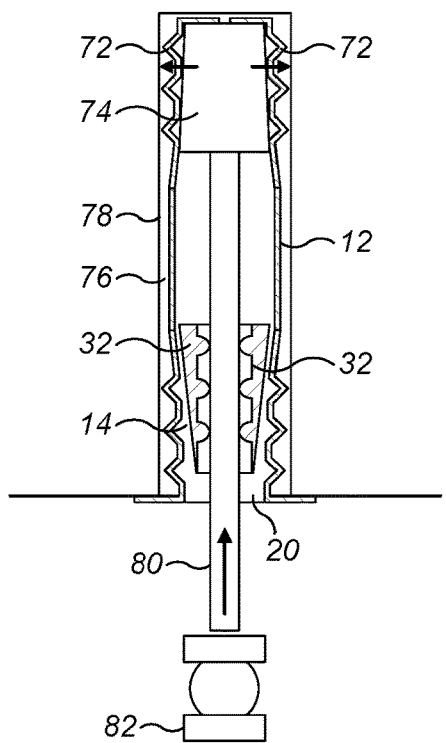
Figure 8D:
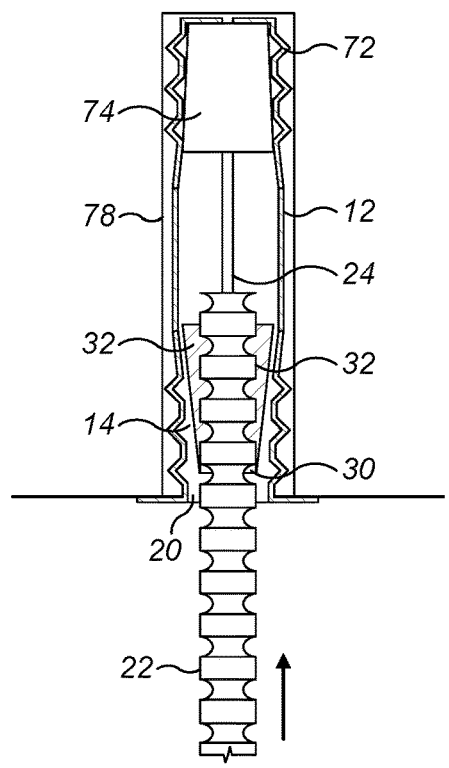
Figure 8E:
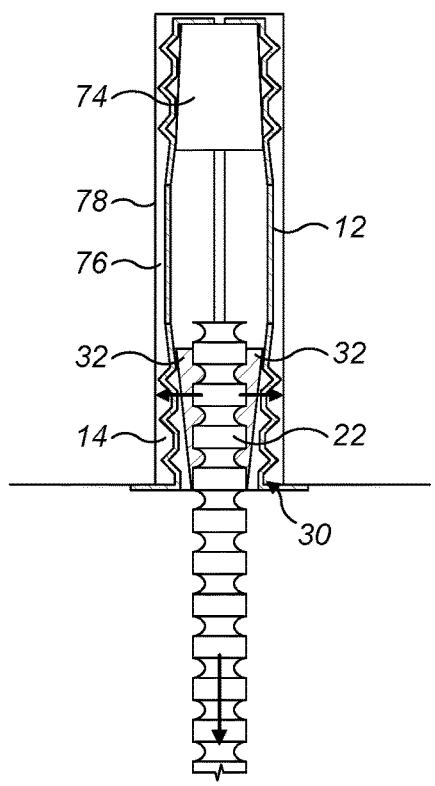
Figure 8F:
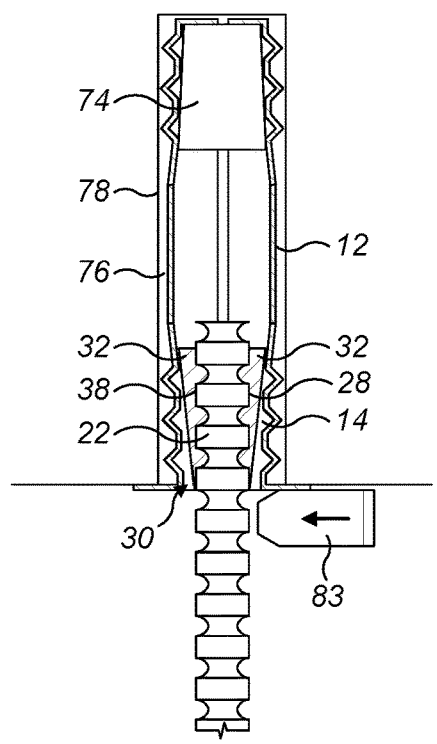
Figure 8G:
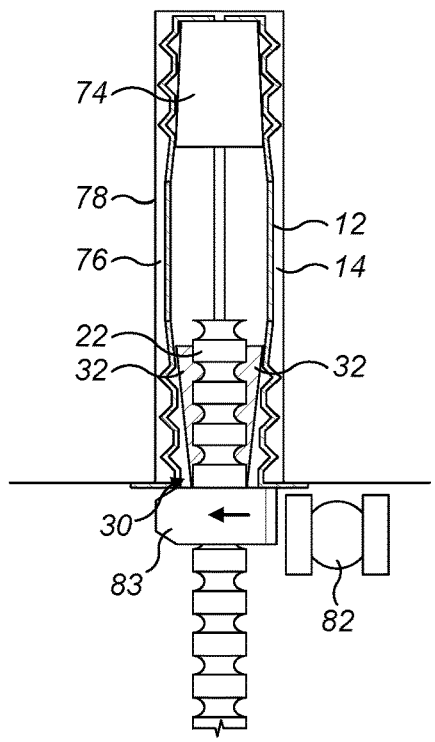
Figure 9:
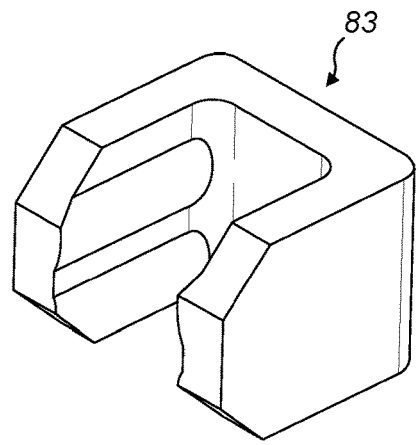
FIG. 9 is a perspective view of the retainer/spacer illustrated in FIGS. 8F and 8G.

Referring to FIG. 7 there is illustrated fastener assembly 10 incorporated into an anchor, generally identified by reference numeral 70. With anchor 70, an end of body 12 remote from access opening 20 is being segmented into three or four body segments 72 and body 12 houses an impact activated wedge member 74 (visible in FIG. 8B through FIG. 8G. Referring to FIG. 8A, a pilot hole 76 is first drilled in a wall 78. Referring to FIG. 8B, an impact rod 80 is inserted into access opening 20 of cavity 14 to engage wedge member 74. Referring to FIG. 8C, a hammer 82 is used to strike impact rod 80 to exert a force upon wedge member 74. Wedge member 74 is moveable upon impact to force body segments 72 of body 12 outwardly to anchor body 12 in wall 78. Impact rod 80 is then removed to facilitate the insertion of member 22. The remainder of the installation is as previously described. Referring to FIG. 8D, first end 24 of member 22 is inserted through access opening 20 into cavity 14 of body 12. Wedge segments 32 of split wedge 30 are positioned circumferentially around member 22. Referring to FIG. 8E, split wedge 30 is then wedged in cavity 14 to maintain external profile 28 of member 22 engaged with internal profile 38 of wedge segments 32 of split wedge 30. Depending upon the force vector associated with the load to be placed upon member 22, gravity may not be relied upon to maintain split wedge 30 engaged in cavity. For this reason, it is preferred that a retainer/spacer 83 be used. It should be noted that a retainer/spacer, such as retainer/spacer 83, is also advisable where there is a danger that the engagement is prone to release when bumped or subjected to vibration. There will hereafter be described other embodiments that utilize a retainer/spacer to guard against accidental release. Referring to FIG. 8E and FIG. 8F, there is illustrated how retainer/spacer 83 is positioned to prevent movement of member 22 toward body 12, which movement could potentially initiate a release of member 22 as described above. Referring to FIG. 9, this is illustrated retainer/spacer 83. Referring to FIG. 8F and FIG. 8G, retainer/spacer 83 is placed in position using hammer 82 and merely clamps onto member 22 and shoulders against body 12 to prevent relative movement of member 22 and body 12. In view of the engagement between member 22 and split wedge 30, this serves to prevent relative movement of split wedge 30 and body 12 when split wedge 30 is wedged in cavity 14, thereby preventing unintentional release of member 22.

Figure 10A:
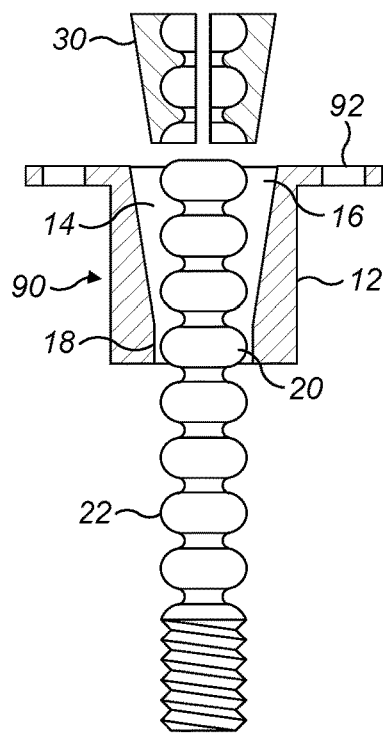
FIG. 10A through 10D are a series of sequential side elevation views, in section, of the fastener assembly of FIG. 1A through FIG. 1H incorporated into a flanged hanger and showing sequentially how to engage components.
Figure 10B:
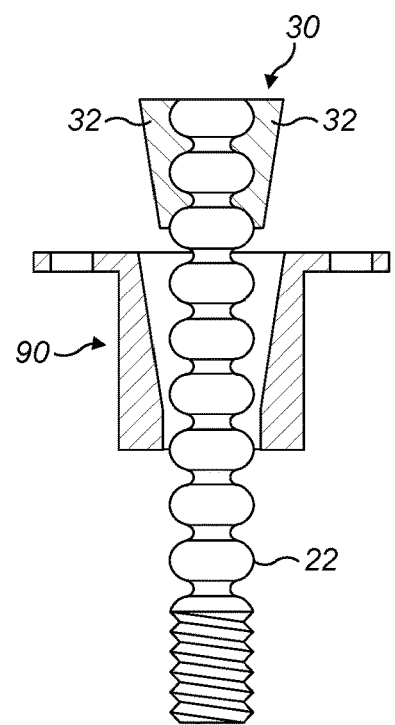
Figure 10C:
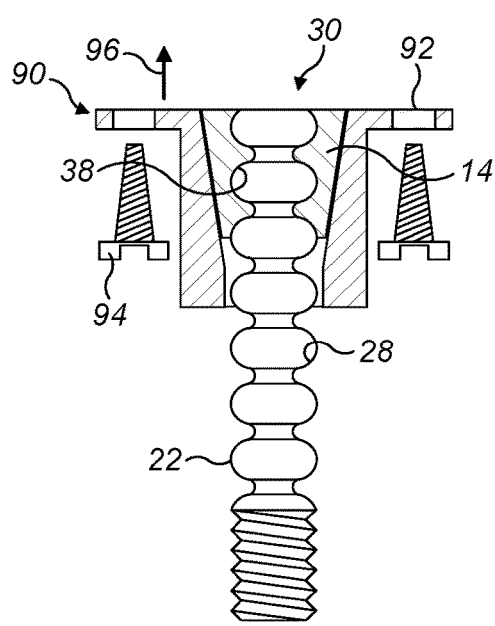
Figure 10D:
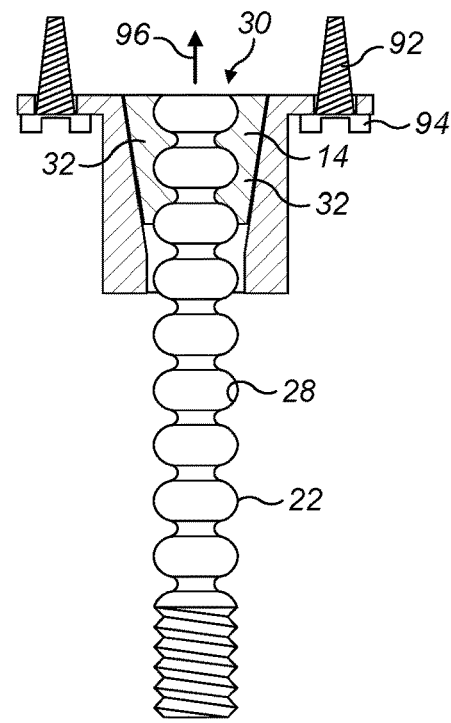

Referring to FIG. 10A through 10D there is illustrated fastener assembly 10 incorporated into a flanged hanger, generally identified by reference numeral 90. With flanged hanger 90, body 12 has a mounting flange 92 that receives fasteners 94 for mounting body 12 to an object or a surface 96. The orientation of cavity 14 in body 12 of flanged hanger 90 is with larger end 16 oriented toward mounting flange 92 and smaller end 18 oriented away from mounting flange 92. Referring to FIG. 10A, split wedge 30 is inserted into body 12 from above and member 22 is inserted through access opening 20 into cavity 14 from below. Referring to FIG. 10B, wedge segments 32 of split wedge 30 are positioned circumferentially around member 22. Referring to FIG. 10C, split wedge 30 is then wedged in cavity 14 to maintain external profile 28 of member 22 engaged with internal profile 38 of wedge segments 32 of split wedge 30. Referring to FIG. 10D, mounting flange 92 of body 12 is then secured to surface 96 by fasteners 94. Surface 96 prevents split wedge 30 from moving upwardly and, as such, serves as a securing element to maintain split wedge 30 engaged with cavity 14 with external profile 28 of member 22 engaged with internal profile 38 of wedge segments 32 of split wedge 30.

Figure 11:
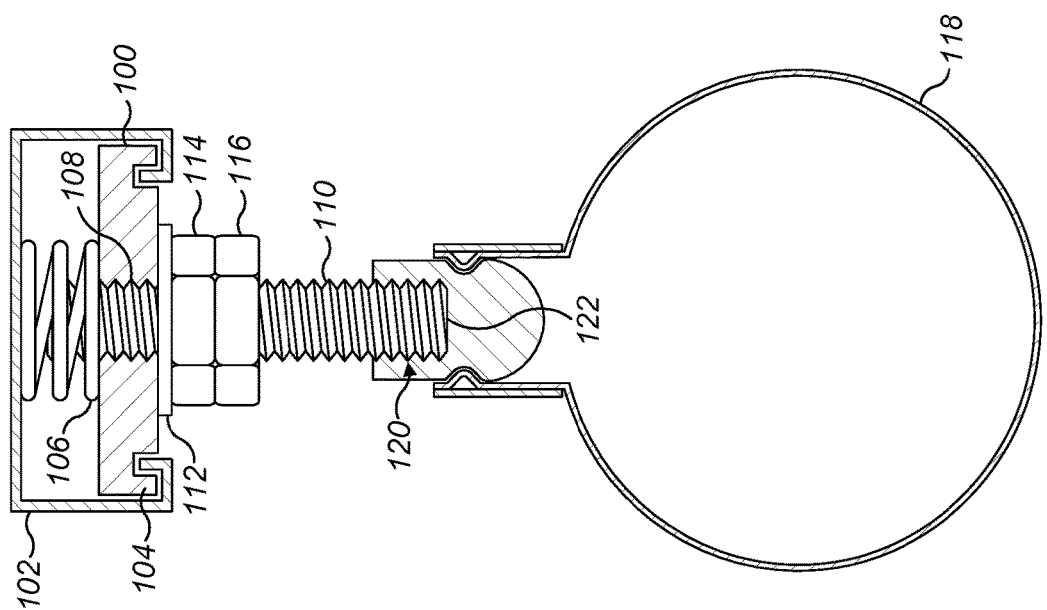
FIG. 11 is a side elevation view, in section, labelled as PRIOR ART of a commercially available pipe support.

Referring to FIG. 11, there is illustrated a commercially available pipe support, generally indicated by reference numeral 100. Pipe support 100 is PRIOR ART and is shown sole for purposes of comparison. Pipe support 100 has a body 102 with a floating plate 104. Floating plate 104 is biased in position by a spring 106. Floating plate has a threaded opening 108. A threaded rod 110 is threaded into threaded opening 108, and is suspended from body 102. In order to lock threaded rod 110 in a selected position a washer 112, a nut 114 and a locking nut 116 are provided. A hanger band 118 is attached to a threaded body 120 which is secured to a remote end 122 of threaded rod 110.

Figure 12:
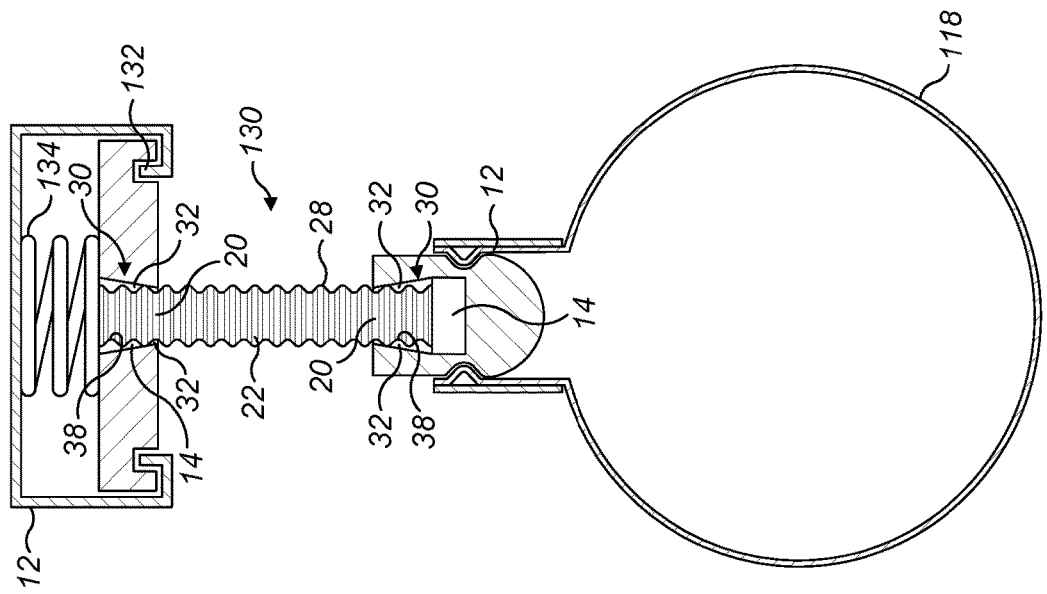
FIG. 12 is a side elevation view, in section, of the fastener assembly of FIG. 1A through FIG. 1H incorporated into a pipe support for comparison with FIG. 11.

Referring to FIG. 12, there is illustrated fastener assembly 10 incorporated into a pipe support, generally identified by reference numeral 130 for the purpose of side by side comparison the PRIOR ART illustrated in FIG. 11. Pipe support 130 has a body 12 which is intentionally made to resemble body 102 of FIG. 11. Body 12 is provided with a floating plate 132, which is the equivalent of floating plate 104 of FIG. 11. Member 22 is a rod, which is the equivalent of threaded rod 110 of FIG. 11. However, the engagement between member 22 and body 12 is as described with reference to fastener assembly 10. Wedge segments 32 of split wedge 30 are positioned circumferentially around member 22 and split wedge 30 is wedged into cavity 14 of body 12 to maintain external profile 28 of member 22 engaged with internal profile 38 of wedge segments 32 of split wedge 30. A spring 134 is provided, which is not unlike spring 106 of FIG. 11. However, spring 134 serves a different role, serving to bias split wedge 30 into engagement with cavity 14, until a predetermined force is exerted to overcome the biasing force of spring 134. A hanger band 118 is provided which is identical to hanger band 118 of FIG. 11. However, instead of threaded body 120 of FIG. 11, there is provided a second body 12, with a second split wedge 30, which engages member 22 as described with fastener assembly 10.

Upon comparison of FIG. 11 and FIG. 12, it will be noted that there is a saving of materials as FIG. 12 has no equivalent to washer 112, nut 114 and locking nut 116. Upon comparison of saving in installation time, it takes less time to assemble split wedge 30 around member 22 and split wedge 30 into cavity, than it does to screw rod 110 into threaded opening 108 and then thread nut 114 and locking nut 116 along threaded rod 110 into position.

Figure 13A:
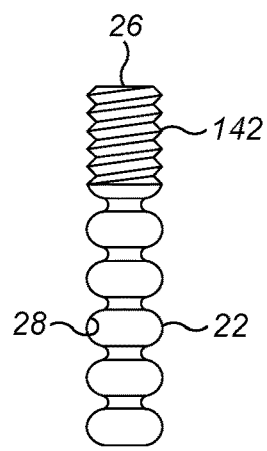
FIG. 13A through 13F are a series of sequential side elevation views, in section, of the fastener assembly of FIG. 1A through FIG. 1H incorporated into a pipe hanger for a pipe bracket and showing sequentially how to engage components.
Figure 13B:
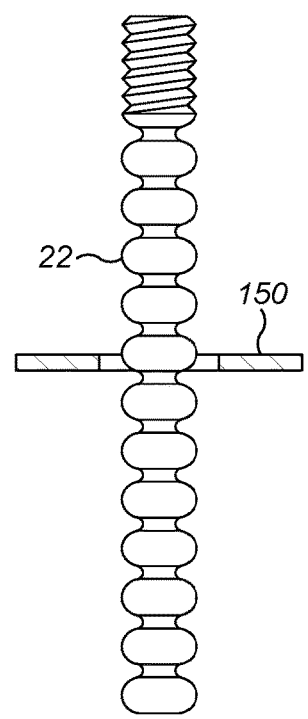
Figure 13C:
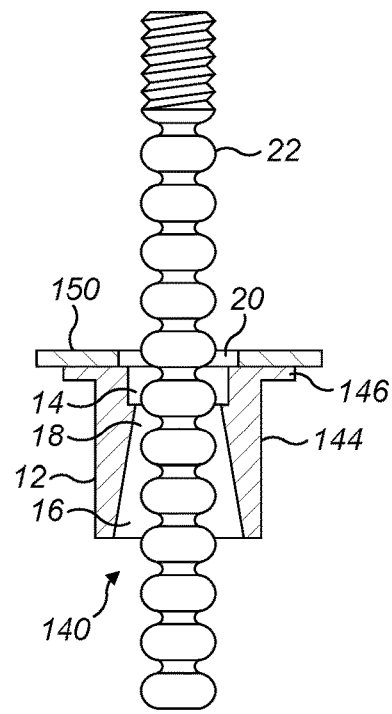
Figure 13D:
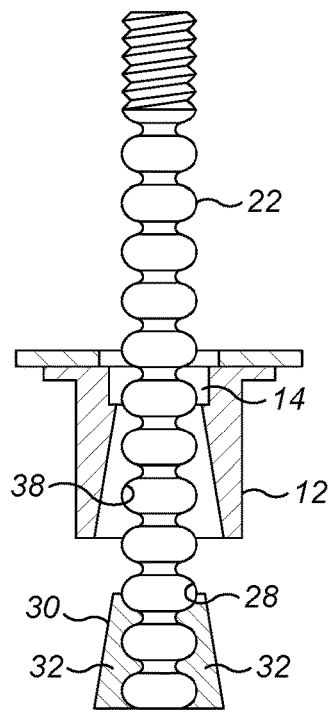
Figure 13E:
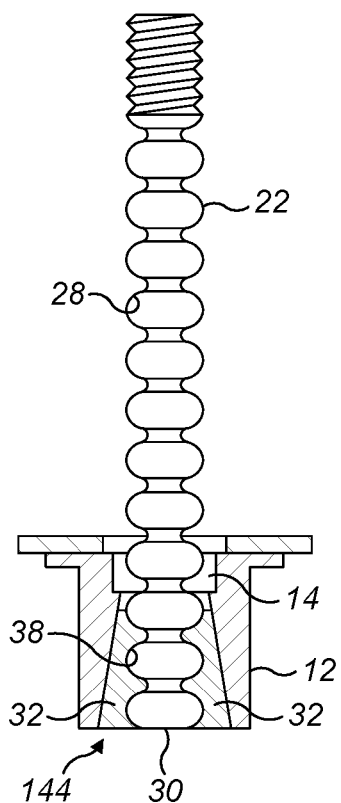
Figure 13F:
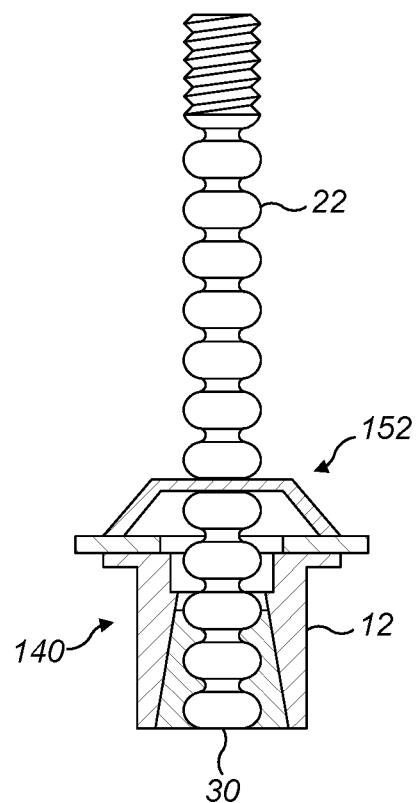
Figure 14:
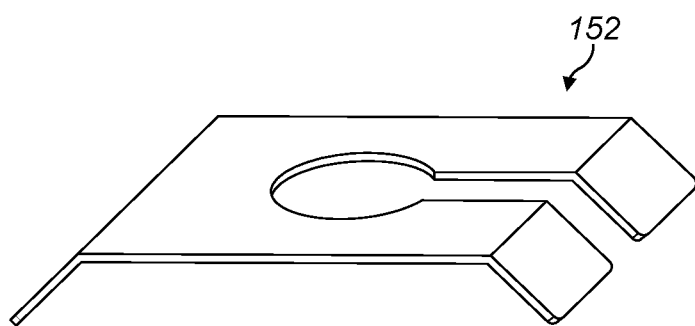
FIG. 14 is a perspective view of a spring retainer/spacer used in FIG. 13F.

Referring to FIG. 13A through 13F, there is illustrated fastener assembly 10 incorporated into a pipe hanger for a pipe bracket, generally identified by reference numeral 140. With pipe hanger 140, in addition to external profile 28, member 22 has a circumferential helical profile 142 (thread form) at second end 26. There is also illustrated an alternative form of flanged hanger 144. Body 12 of flanged hanger 144 has a flange 146. With flanged hanger 144, the orientation of cavity 14 in body 12 is with smaller end 18 oriented toward flange 146 and larger end 16 oriented away from flange 146. There will now be described how pipe hanger 140 supports a pipe bracket 150. Referring to FIG. 13A, circumferential helical profile 142 (thread form) at second end 26 of member 22 is threaded into an internally threaded female receptacle (not shown), such that member 22 is suspended in a vertical orientation. Referring to FIG. 13B, pipe bracket 150 is positioned along member 22. Referring to FIG. 13C, access opening 20 of body 12 of flanged hanger 144 is placed over member 22 and body 12 is slid in an underlying position with flange 146 engaging pipe bracket 150. Referring to FIG. 13D, internal profile 38 of wedge segments 32 of split wedge 30 are engaged with external profile 28 of member 22. Referring to FIG. 13E, body 12 of flanged hanger 144 is lowered into a position where it overlies split wedge 30 with cavity 14 forcing internal profile 38 of wedge segments 32 of split wedge 30 into engagement with external profile 28 of member 22. It will be noted that this configuration can be maintained in position by force of gravity. Referring to FIG. 13F, where there is concern of an accidental release of member 22 from body 12, a spring retainer/spacer 152 may be added to engage member 22 to prevent relative movement of member 22 and body 12, such that movement of split wedge 30 is prevented. Referring to FIG. 14 there is illustrated spring retainer/spacer 152 as used in FIG. 13F. The reason spring retainer/spacer 152 might be seriously considered is in areas in which an accidental striking of pipe hanger 140 is possible due to human or machine traffic in the vicinity.

Figure 15:
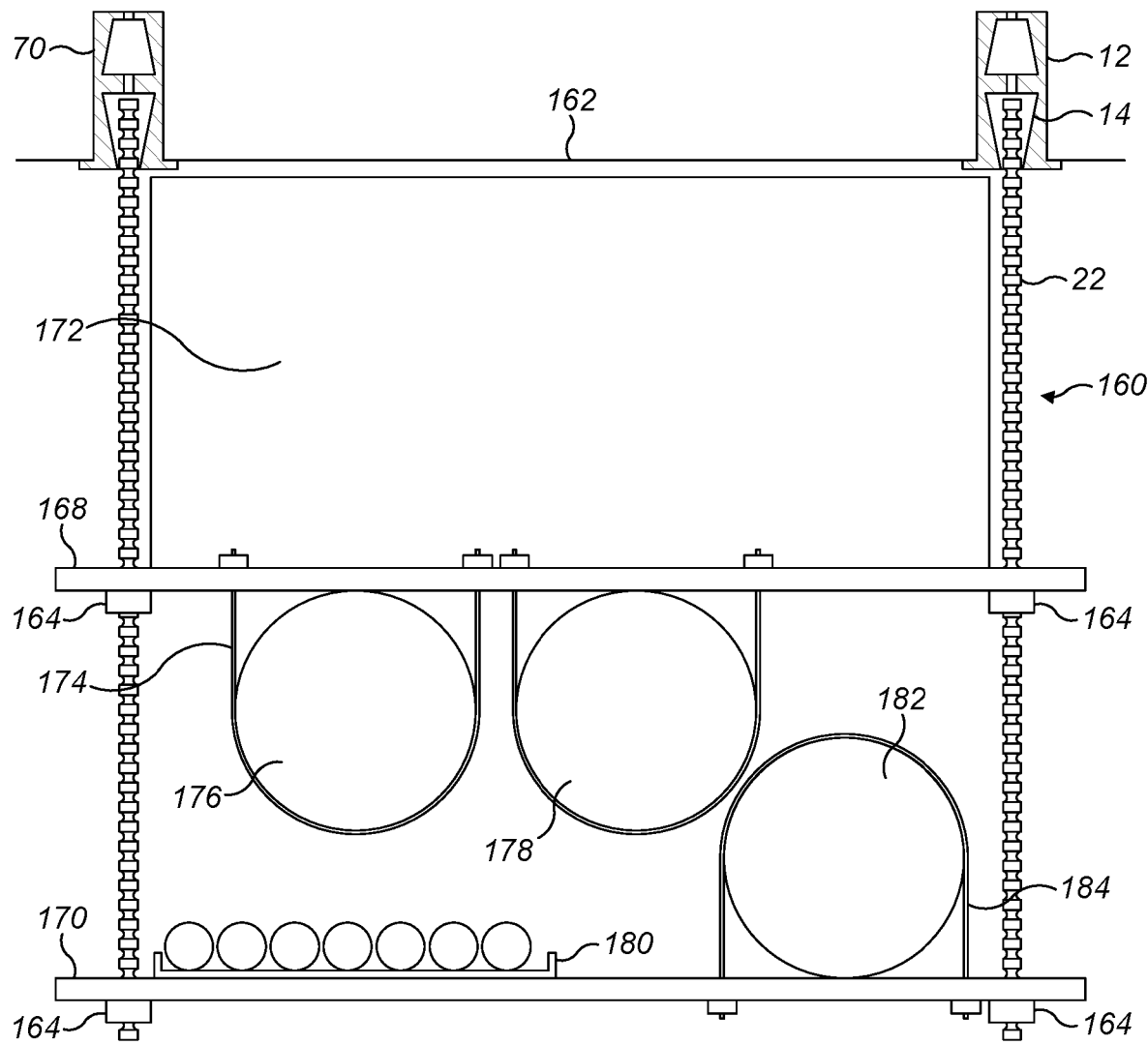
FIG. 15 is a side elevation view, in section, of a trapeze installation.
Figure 15A:
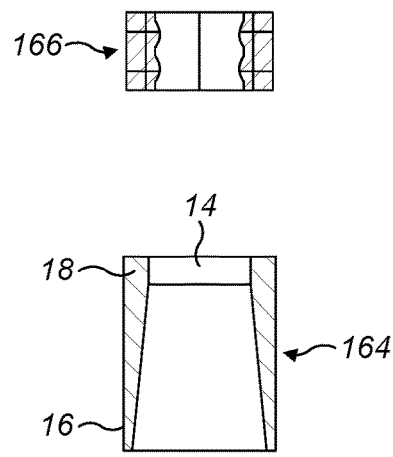
FIG. 15A is an exploded detailed side elevation view, partially in section of the shelf support illustrated in FIG. 15.
Figure 15A:
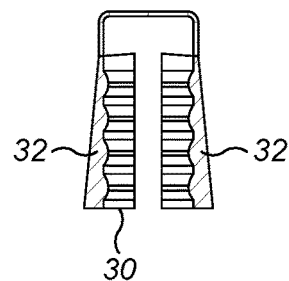
Figure 15A:
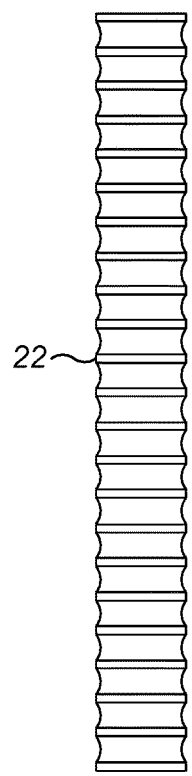

Referring to FIG. 15, there is illustrated fastener assembly 10 incorporated into a trapeze installation, generally identified by reference numeral 160. With trapeze installation 160, anchors 70, as previously described with reference to FIG. 7 and FIG. 8A through FIG. 8G are used to suspend members 22 from a ceiling 162. Where trapeze installation 160 differs from other installations is the positioning of shelves to create multiple levels. This is accomplished through the use of a body 12 in the form of a tapered container 164. Referring to FIG. 15A, tapered container 164 is illustrated with components. As with all bodies 12, tapered container 164 has a cavity 14 having a larger end 16 to smaller end 18. Tapered container 164 forces split wedge 30 into engagement with member 22 and in that manner tapered container 164 holds its position to support shelves. Tapered container 164 can be used with a spacer/retainer 166, which prevents upward movement of tapered container 164. Trapeze installation 160, as selected for illustration, shows two shelves 168 and 170. Shelf 168 supports ducting 172, and has suspended below it by means of U-bolts 174 a water pipe 176 and a gas pipe 178. Shelf 170 is shown as supporting a cable tray 180 and a sprinkler pipe 182. Sprinkler pipe 182 is secured to shelf 170 by U-bolt 184.

Figure 4:
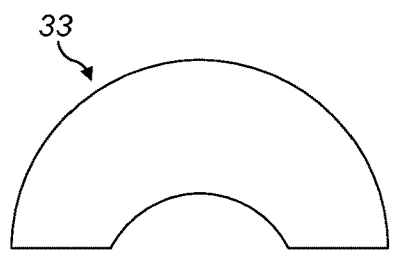
FIG. 4 is an end elevation view of the first alternative split wedge configuration illustrated in FIG. 3.
Figure 16:
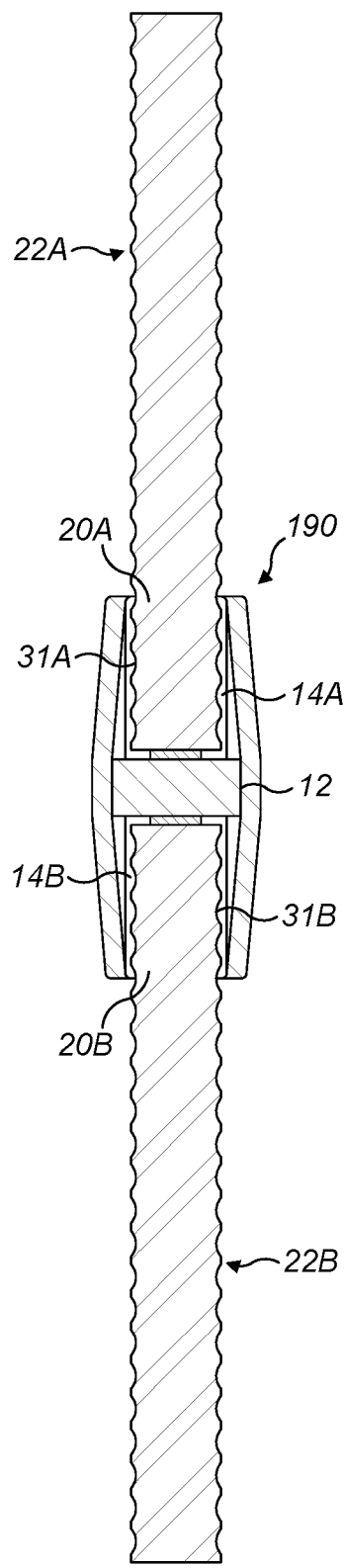
FIG. 16 is a side elevation view, in section, of the fastener assembly of FIG. 1A through FIG. 1H incorporated into a linear connector.
Figure 16A:
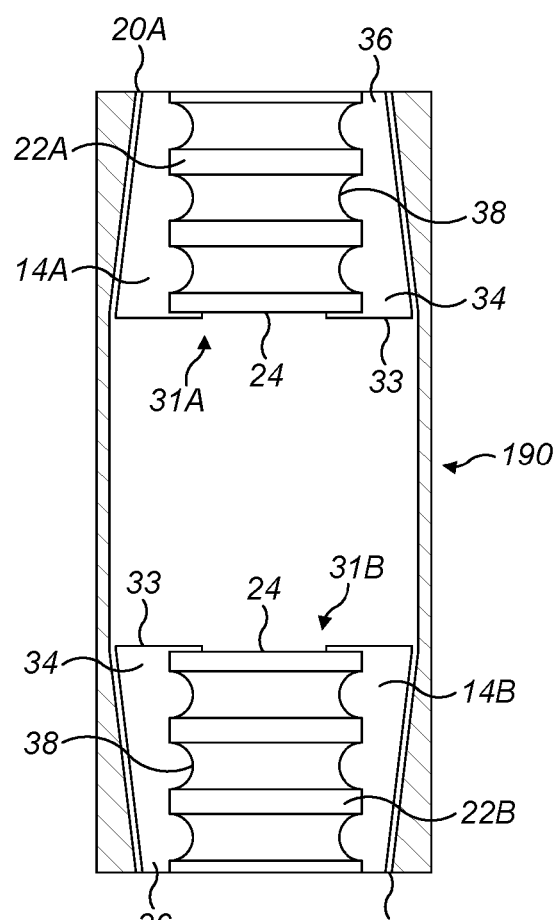
FIG. 16A is an enlarged side elevation view, in section, of the linear connector illustrated in FIG. 16.

Referring to FIG. 16, there is illustrated fastener assembly 10 incorporated into a linear connector, generally identified by reference numeral 190. Linear connector 190 has been selected to show that one body 12 may have more than one cavity 14 and more than one access opening 20. This facilitates multiple members 22 to be engaged with the same body 12. Linear connector 190 happens to have two cavities and two axially aligned access openings. A first access opening 20A of the two axially aligned access openings allows a first member 22A to access a first cavity 14A. A second access opening 20B of the two axially aligned access openings allows a second member 22B to access a second cavity 14B. FIG. 16A is an enlarged view, in section, of linear connector 190 illustrated in FIG. 16. It is to be noted that there is nothing to prevent first member 22A or second member 22B from passing right through body 12 of linear connector 190 without engaging a split wedge. For that reason, a first alternative configuration of split wedge, generally identified by reference numeral 31 and illustrated in FIG. 3 and FIG. 4 was developed. Referring to FIG. 3 and FIG. 4, split wedge 31 has a stop 33 that was not present in split wedge 30 illustrated in FIG. 2. Stop 33 is in the form of an inwardly directed flange positioned at thick end 34 of each of wedge segments 32. Referring to FIG. 16A, there are two split wedges used in linear connector 190, split wedge 31A interacts with rod 22A and cavity 14A and split wedge 31B interacts with rod 22B and cavity 14B. Split wedge 31A has a stop 33 that engages first end 24 of member 22A. Split wedge 31B similarly has a stop 33 that engages first end 24 of member 22B.

Referring to FIG. 17A through 17E, there is illustrated fastener assembly 10 incorporated into a nut and bolt fastener, generally identified by reference numeral 200. With nut and bolt fastener 200, member 22 has a bolt head 202. Body 12 slides along member 22 to overlie split wedge 30. There is also a retainer/spacer 204, the use of which will hereinafter be described. Use will now be described in relation to the mounting of a boat propeller 206. At the present time boat propellers are secured in position using a washer, a nut and a locking nut. Should the boat propeller become bent, it can be difficult to remove. Referring to FIG. 17A, boat propeller 206 is mounted on member 22. Referring to FIG. 17B, body 12 is slid along member 22. An example of a suitable body is the tapered container illustrated in FIG. 15A. Referring to FIG. 17C, split wedge 30 is placed in position with internal profile 38 of wedge segments 32 of split wedge 30 engaged with external profile 28 of member 22. Referring to FIG. 17D, body 12 is slid into a position where it overlies split wedge 30 with cavity 14 forcing internal profile 38 of wedge segments 32 of split wedge 30 into engagement with external profile 28 of member 22. Referring to FIG. 17E, retainer/spacer 204 is then positioned between boat propeller 206 and body 12. Retainer/spacer 204 serves as a securing element that attaches to member 22 to prevent movement of body 12 that would release split wedge 30 from engagement with member 22. Referring to FIG. 18 there is illustrated a perspective view of retainer/spacer 204 as used in FIG. 17E.

Referring to FIG. 19, there is illustrated fastener assembly 10 incorporated into a ladder, generally identified by reference numeral 210. A unique aspect of ladder 210, is that it can be transported disassembled as a ladder kit and then assembled in situ. This enables ladder 210 to be passed in a disassembled state through openings that it will not pass through when assembled. An example of such a small opening is a hatch of a boat. It will be appreciated that there are numerous other applications for such a ladder kit. In a disassembled state, the components would consist of a pair of side rails 212 and 214, a plurality of rungs 216 and associated fasteners, as will hereinafter be described. Referring to FIG. 20 there is illustrated a perspective view of one of rungs 216 from ladder 210. FIG. 21A is a front elevation view, in section, of the ladder of FIG. 19, with rungs removed. Referring to FIG. 21A, ladder 210 is assembled by placing side rails 212 and 214 in parallel side by side relation. Side rails 212 and 214 serve as body 12 as each they have a series of axially spaced cavities 14. Referring to FIG. 21B, side rail 212 and side rail 214 have an inside face 213 and an outside face 215. Cavities 14 are oriented such that larger end 16 of each cavity faces toward outside face 215 and smaller end 18 of each cavity 14 faces toward inside face 213. Members 22 are arranged in parallel spaced relation. First end 24 of members 22 are extended into access openings 20 of each of cavities 14 in side rail 212 and second end 26 of members 22 are extended through access openings 20 of each of cavities 14 in side rail 214. Split wedges 30 are placed in position with internal profile 38 of wedge segments 32 of split wedge 30 engaged with external profile 28 of member 22 at first end 24. Split wedges 30 are placed in position with internal profile 38 of wedge segments 32 of split wedge 30 engaged with external profile 28 of member 22 at second end 26. Side rail 212 and side rail 214 are then slowly moved apart until each of side rail 212 and side rail 214 overlie split wedge 30 with cavity 14 of each of side rail 212 and side rail 214 forcing internal profile 38 of wedge segments 32 of split wedge 30 into engagement with external profile 28 of member 22. An outward force forcing side rail 212 and side rail 214 away from each other would have no effect, in view of the above described. However, an inward force forcing side rail 212 and side rail 214 toward each other would have the potential of releasing first end 24 of members 22 from side rail 212 or second end 26 of members 22 from side rail 214. Referring to FIG. 19, a beneficial aspect of ladder 210 is that rungs 216 serve as securing elements that prevent inward relative movement of side rail 212 and side rail 214.

Referring to FIG. 22, there is illustrated member 22 configured as a rotatable fastener, generally identified by reference numeral 220, that would be an alternative to screw fastener 51 illustrated in FIG. 5A through FIG. 5C. Screw fastener 51 is rotated by means of drive head 52 which engages a tool, such as a screw driver. Rotatable fastener 220 is intended to be rotated by a wrench. Member 22 of rotatable fastener 220 has flat wrench engagement surfaces 222. Wrench engagement surfaces 222 can be positioned anywhere along member 22. It is preferred, however, wrench engagement surfaces be positioned in an intermediate position. This facilitates member 22 having external profile 28 required to function with fastener assembly 10 at first end 24 and a circumferential helical profile 224 (thread form) at second end 26.

Referring to FIG. 23, there is illustrated body 12 configured as a female threaded adaptor, generally identified by reference numeral 230. With female threaded adaptor 230, body 12 has an internally threaded female receptacle 232 spaced from access opening 20 into cavity 14. As illustrated threaded female receptacle 232 is axially aligned with access opening 20. It will be appreciated that threaded female receptacle 232 and access opening 20 need not be axially aligned. It will hereinafter be explained why there is an advantage in having them axially aligned. One thing to note is that split wedge 30 cannot possibly pass through threaded female receptacle 232. The only way to insert split wedge 30 into cavity 14 is through access opening 20. For the purpose of inserting split wedge 30, body 12 is effectively a blind bore with a single access opening 20. Referring to FIG. 3 and FIG. 4, in order to address this problem, split wedge 31 is used. Thick end 34 of each of wedge segments 32 has a chamfer 234 to facilitate insertion of thick end 34 of split wedge 31 into cavity 14 through access opening 20. Once split wedge 31 is in position within cavity 14, it engages in the same manner as has previously been described with all of the other applications of fastener assembly 10. Having threaded female receptacle 232 axially aligned with access opening 20 provides a secondary advantage. When an externally threaded rod (not shown) is engaged with threaded female receptacle 232, it can extend into cavity 14 and exert a force upon thick end 34 of wedge segments 32. When this is done, the externally threaded rod serves as a securing element to maintain split wedge 30 wedged in cavity 14 and fully engaged with member 22.

Referring to FIG. 1E through FIG. 1H, there was described the use of a removal tool 46 for use if split wedge 30 became "stuck" in cavity 14. As described above, removal tool 46 consists of a sleeve 48 with a flange 50. In considering alternative structures for split wedge 30, there was developed a form of split wedge with built in removal tool, generally identified by reference numeral 250. Referring to FIG. 24, split wedge 250 has a split extension sleeve 252 that terminates in a contact surface 254. In the initial proto-type, contact surface 254 was in two pieces serving as extensions of wedge segments 32. However, it was then realized that contact surface 254 would be stronger if it could be made as a flange 256. It was then realized that flange 256 together with split extension sleeve 252 formed a flexible hinge that connected wedge segments 32. When reviewing that portion of split wedge 250 illustrated in FIG. 24, it must be appreciated that what is illustrated is merely the extension portion that is attached to thin end 36 of split wedge 30, as illustrated in FIG. 2 and FIG. 3. Split wedge 250 with extension sleeve 252 is a second alternative split wedge configuration.

Figure 25A:
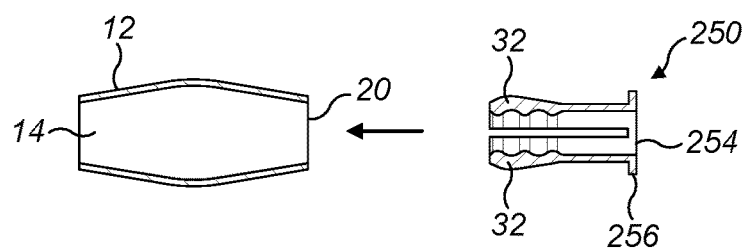
Figure 25B:
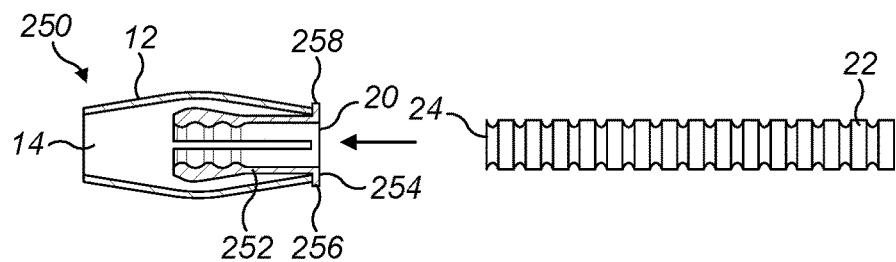
Figure 25C:
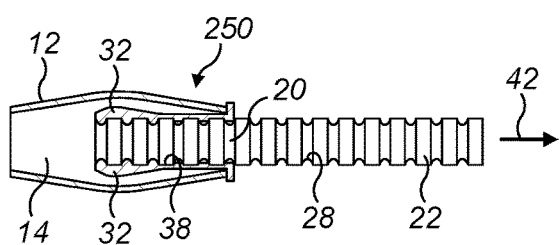
Figure 25D:
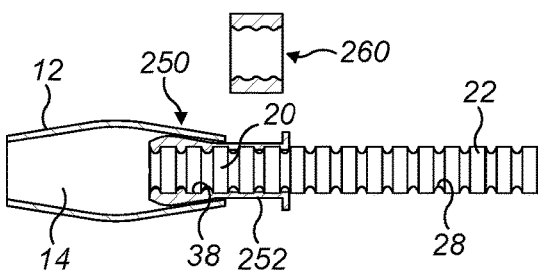
Figure 25E:
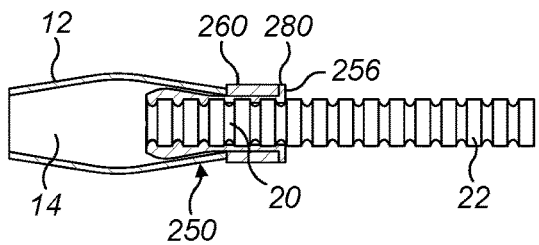

Referring to FIG. 25A through 25I there are a series of sequential side elevation views, in section, of the fastener assembly of FIG. 1A through FIG. 1H, used with split wedge 250. Referring to FIG. 25A, split wedge 250 is inserted into cavity 14 of body 12 through access opening 20. To achieve insertion, force can be exerted upon contact surface 254 of flange 256, if required. Referring to FIG. 25B, flange 256 does not pass through access opening 20, as surface 258 of flange 256 but serves as a stop. Referring to FIG. 25B, member 22 is secured to body 12 by inserting first end 24 of member 22 through access opening 20 into cavity 14 of body 12. Referring to FIG. 25C, once wedge segments 32 of split wedge 250 are positioned circumferentially around member 22, split wedge 250 is then wedged in cavity 14 to maintain external profile 28 of member 22 engaged with internal profile 38 of wedge segments 32 of split wedge 250. Split wedge 250 can usually be engaged by slowly pulling member 22 back toward access opening 20 as indicated by direction arrow 42. Referring to FIG. 25D, it is to be noted that split extension sleeve 252 projects through access opening 20 of cavity 14 when split wedge 250 is wedged in cavity 14 of body 12. Referring to FIG. 25D and FIG. 25E, split wedge 250 is maintained wedged in cavity 14 through the use of a retainer/spacer 260, that is inserted around member 22 between body 12 in the vicinity of access opening 20 and surface 258 of flange 256. Retainer/spacer 260 is similar, if not identical, in structure to retainer/spacer 204 illustrated in FIG. 18. It is to be noted, that by having split extension sleeves 252 project a uniform distance out of access opening 20 in all applications, a uniform size of retainer/spacer 260 may be used.

Figure 25F:
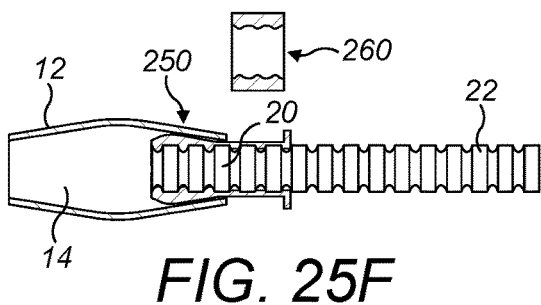
Figure 25G:
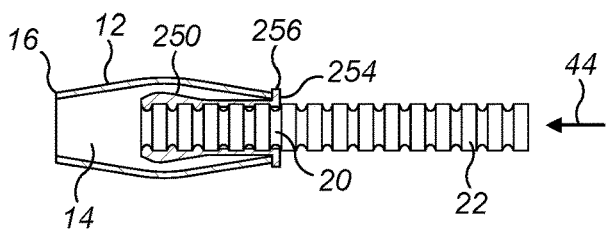
Figure 25H:
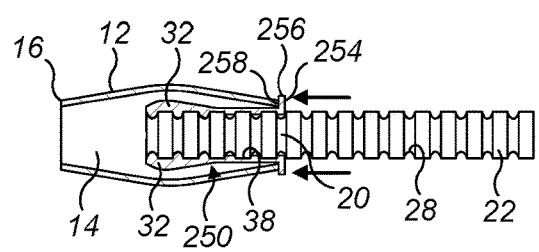
Figure 25I:
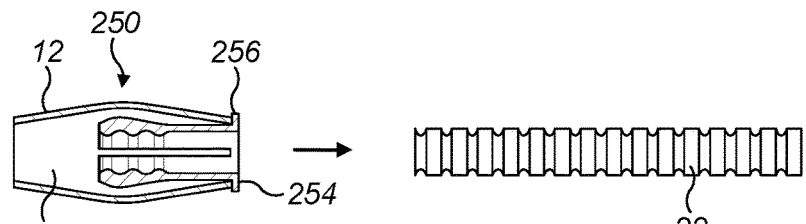

Referring to FIG. 25F, when it is desired to disengage split wedge 250 from member 22, retainer/spacer 260 is removed to allow split wedge 250 to move when a force is exerted upon member 22. Referring to FIG. 25G, a force is then exerted upon member 22, as indicated by direction arrow 44. Referring to FIG. 25H, this results in split wedge 250 being raised toward larger end 16 of cavity 14 where external profile 28 of member 22 can become disengaged from internal profile 38 of wedge segments 32 of split wedge 250. If split wedge 250 becomes "stuck" in cavity 14, force can be exerted by striking contact surface 254 of flange 256 with a hammer (not shown). Split wedge 250 is moved until surface 258 of flange 256 engages body 12 around access opening 20. Referring to FIG. 25H and FIG. 25I, flange 256 is then held in position against body 12, while member 22 is manually withdrawn.

Referring to FIG. 26 and FIG. 27, there is illustrated an enhanced split extension sleeve 282 that encompasses improvements over split extension sleeve 252 illustrated in FIG. 24 and shown functioning in FIG. 25A through 25I. As with split extension sleeve 252, it must be appreciated that split extension sleeve 282 is merely an extension portion that is attached to thin end 36 of split wedge 30 and extends from each of wedge segments 32. As with split extension sleeve 252, split extension sleeve 282 has a contact surface 254 that is in the form of a flange 256. As with split extension sleeve 252, split extension sleeve 282 interacts with a retainer/spacer 260 that is inserted around member 22 between body 12 in the vicinity of access opening 20 and surface 258 of flange 256 (see FIG. 25A through 25I for positioning). The differences between split extension sleeve 282 and split extension sleeve 252 are as follows. A first difference is that flange 256 of split extension sleeve 282 is smaller, so it will pass through access opening 20 of body 12. A second difference is that split extension sleeve 282 is not as long, so that it does not extend as far out of access opening 20 when the split wedge is engaged. Thirdly, the fact that split extension sleeve does not extend as far out of access opening 20, means that a much smaller retainer/spacer 260 can be used. Fourthly, when a smaller retainer/spacer 260 is used, retainer/spacer 260 can be attached to flange 256 by an umbilical cord 284. Referring to FIG. 28, it will be appreciated that split extension sleeve 282 that contact surface 254 may be provided without there being flange 256. It will also be apparent that retainer/spacer 260 may be provided without there being umbilical cord 284.

Referring to FIG. 29A through FIG. 29E, there is disclosed a ball hitch, generally identified by reference numeral 300 for use on vehicles that tow trailers. As with all of the other embodiments, ball hitch 300 has a body 12 defining a cavity 14 that converges from a relatively larger end 16 to a relatively smaller end 18. Body 12 has an access opening 20 positioned at smaller end 18 of cavity 14 that facilitates access to cavity 14. Ball hitch 300 also has an elongated member 22 capable of insertion through access opening 20 into cavity 14. Member 22 has a first end 24, a second end 26 and a circumferential external profile 28. However, a difference with member 22 in this embodiment is that a ball 302 is positioned at second end 26 of member 22. The split wedge 304 used in this embodiment is similar to split wedge 250. Split wedge 304 is made up of wedge segments 32. Each of wedge segments 32 has a thick end 34, a thin end 36 and an internal profile 38 that extends between thick end 34 and thin end 36. Split wedge 304 has an extension sleeve 306 at thin end 36 that terminates in a flange 308 that serves both as a contact surface and serves to connect wedge segments 32. One reason ball hitch 300 has been chosen for illustration is because all of the other embodiments used for illustration were circular (when viewed in cross-section). It will be noted that, in contrast, all components of ball hitch 300 (body 12, split wedge 304 and member 22) are rectangular. Another reason ball hitch 300 has been chosen for illustration is that the loading on member 22 in this application has a shear component in addition to an axial component. As will hereinafter described, a retainer/spacer 310 is used.

Figure 29A:
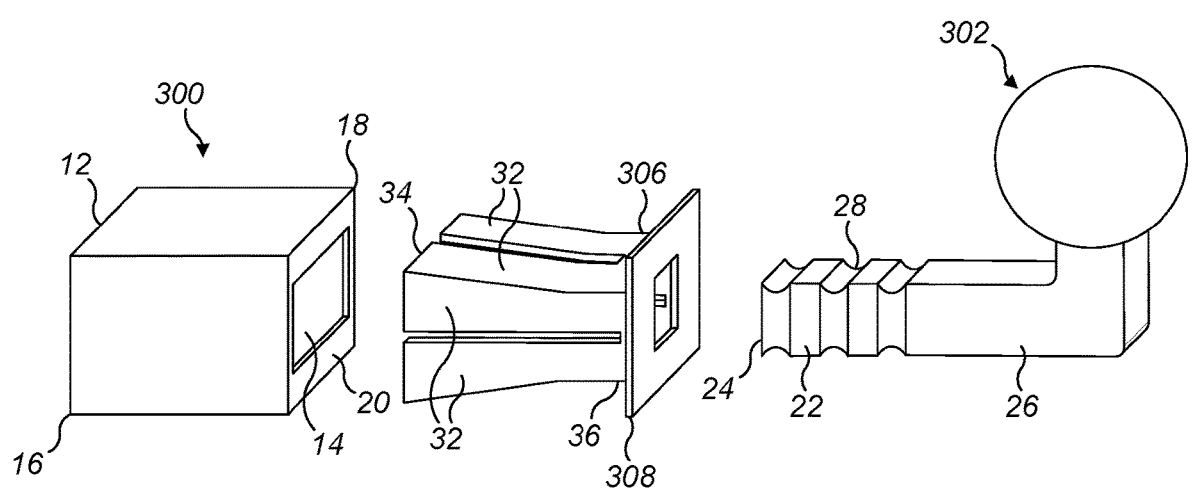
Figure 29B:
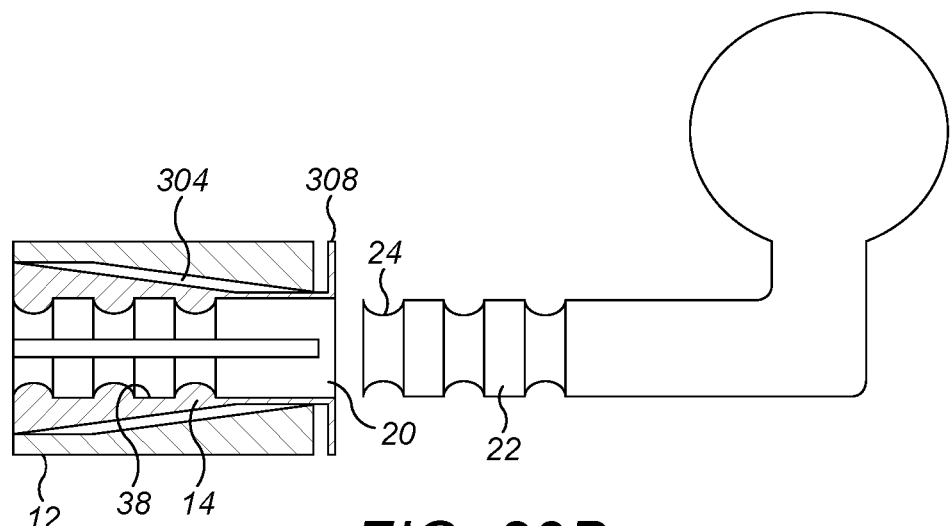
Figure 29C:
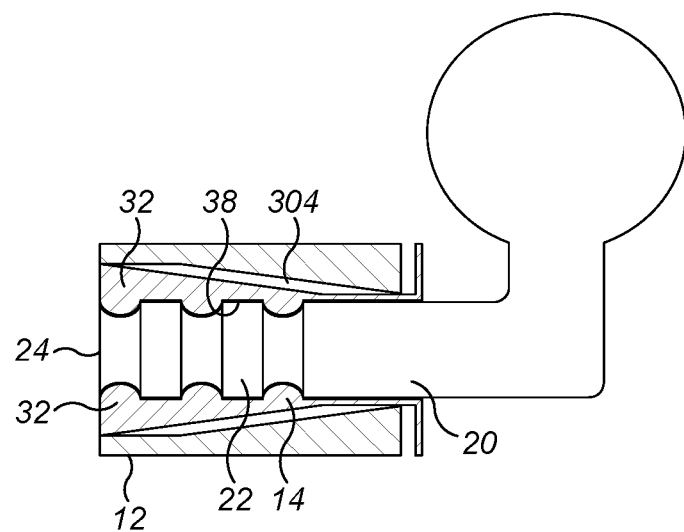
Figure 29D:
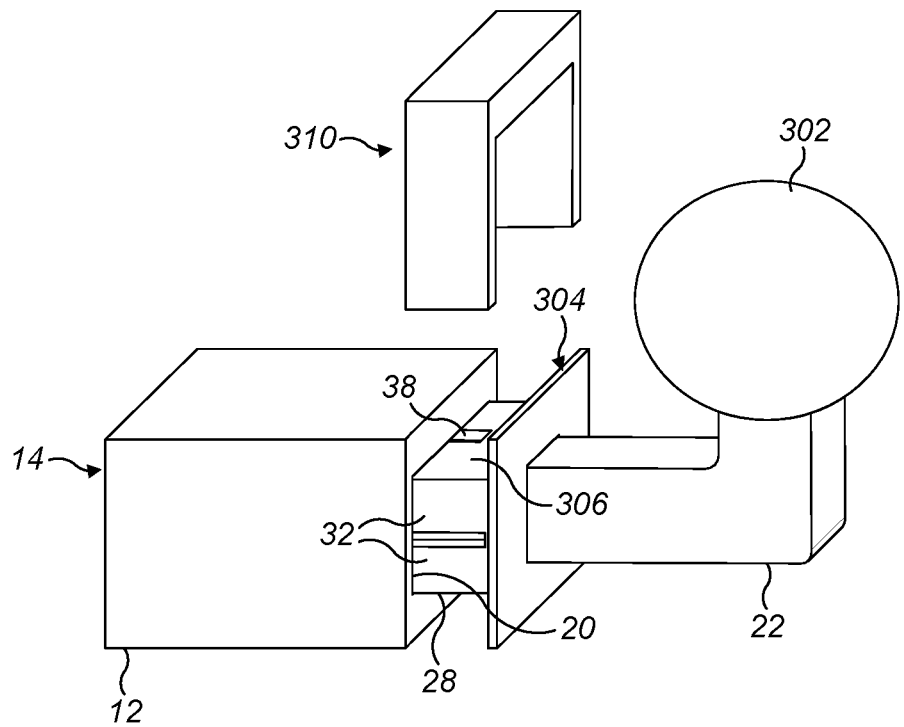
Figure 29E:
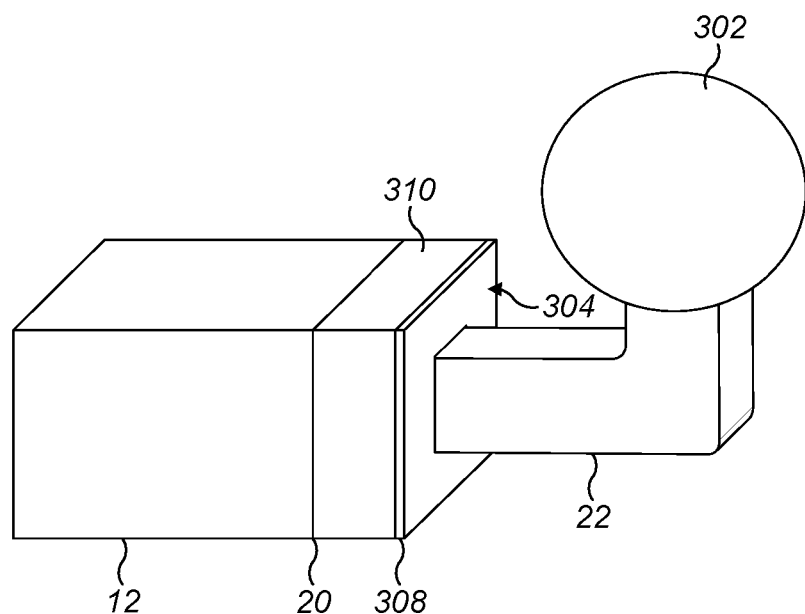

Referring to FIG. 29A through 29E there are a series of sequential side elevation views, in section, ball hitch 300. Referring to FIG. 29A, this exploded side elevation view that shows body 12, split wedge 304 and member 22. Referring to FIG. 29B, split wedge 304 is inserted into cavity 14 of body 12 through access opening 20. To achieve insertion, force can be exerted upon flange 308 which serves as a contact surface, if required. It is noted that flange 308 does not pass through access opening 20. Referring to FIG. 29C, member 22 is secured to body 12 by inserting first end 24 of member 22 through access opening 20 into cavity 14 of body 12 with wedge segments 32 of split wedge 304 positioned circumferentially around member 22. Referring to FIG. 29D, split wedge 304 is then wedged in cavity 14 to maintain external profile 28 of member 22 engaged with internal profile 38 of wedge segments 32 of split wedge 304, in the manner described with previous embodiments. It is to be noted that extension sleeve 306 projects through access opening 20 of cavity 14 when split wedge 304 is wedged in cavity 14 of body 12. Referring to FIG. 29E, split wedge 304 is maintained wedged in cavity 14 through the use of retainer/spacer 310, that is inserted around member 22 between body 12 in the vicinity of access opening 20 and flange 308.

Referring to FIG. 30, there is illustrated a third alternative form of split wedge configuration, generally identified by reference numeral 320. Split wedge 320 is fundamentally the same as split wedge 30. It has two wedge segments 32. Each of wedge segments 32 has a thick end 34 and a thin end 36. An internal profile 38 extends between thick end 34 and thin end 36. Internal profile 38 is capable of engaging external profile 28 of member 22 (not shown). The difference is that flexible hinge 322 connects adjacent side edges 324 and 326 of wedge segments 32.

Figure 31A:
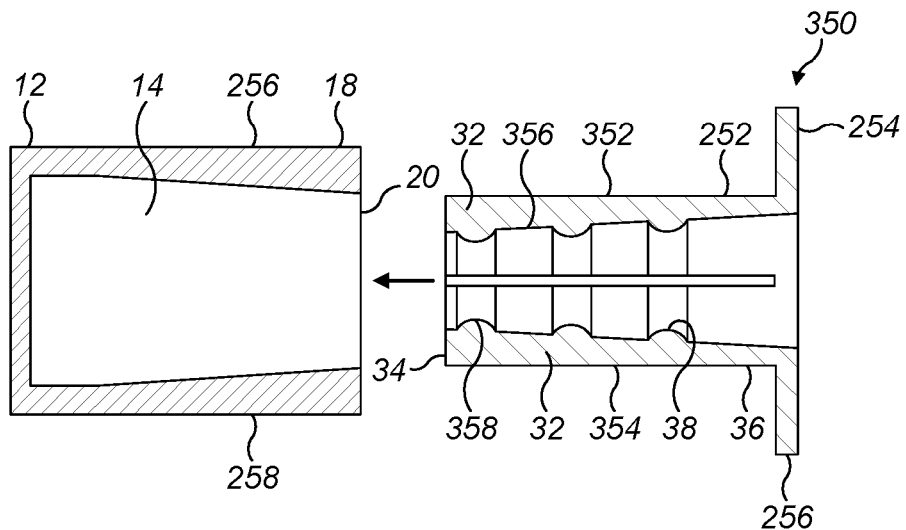
Figure 31B:
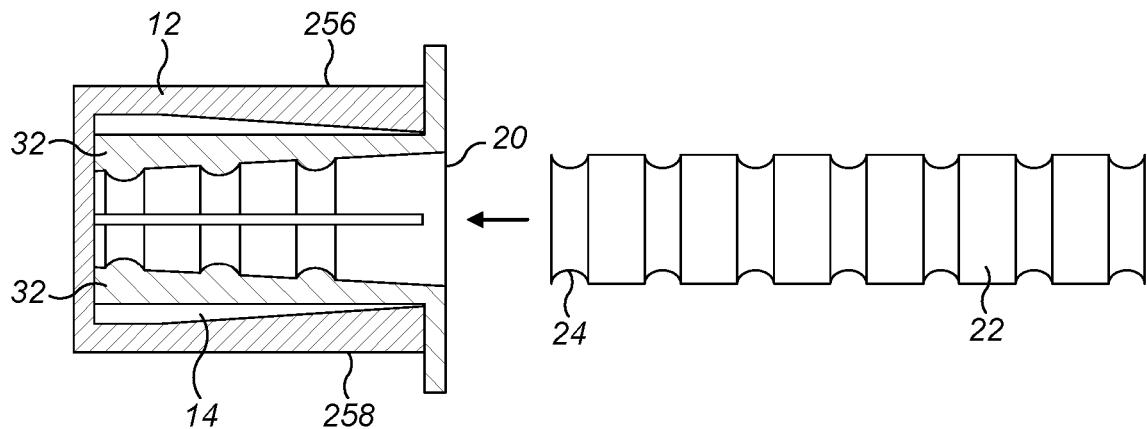

Referring to FIG. 31A, there is illustrated a fourth alternative split wedge configuration, generally indicated by reference numeral 350. Split wedge 350 is fundamentally the same as split wedge 250. It has two wedge segments 32. Each of wedge segments 32 has a thick end 34 and a thin end 36. An internal profile 38 extends between thick end 34 and thin end 36. Internal profile 38 is capable of engaging external profile 28 of member 22. Split wedge 350 has an abbreviated split extension sleeve 252 that terminates in flange 256 that may serve as a contact surface 254. The difference is that split wedge 350 has exterior sidewalls 352 and 354 that are parallel to make insertion through access opening 20 into cavity 14 of body 12 easier. There is an interior tapering with a build-up of material at thick end 34 along interior sidewalls 356 and 358. As will be hereinafter further described in relation to operation, exterior sidewall 352 and 354 at thick end 34 are thrust outwardly when member 22 is inserted into access opening and encounters the interior tapering of interior sidewalls 356 and 358.

Figure 31C:
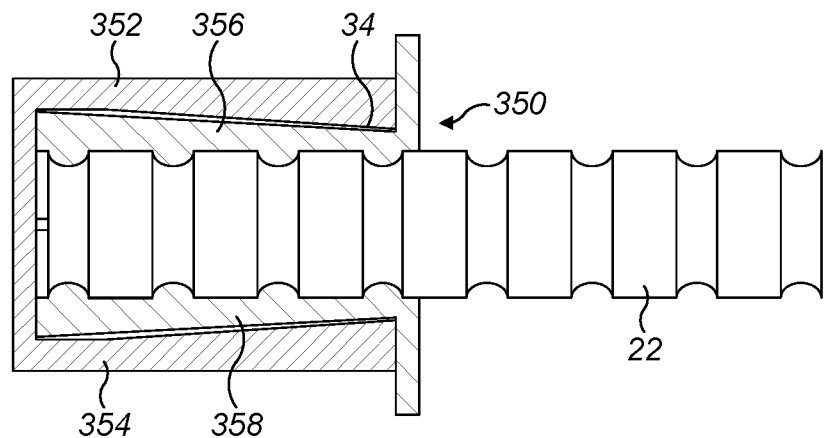
Figure 31D:
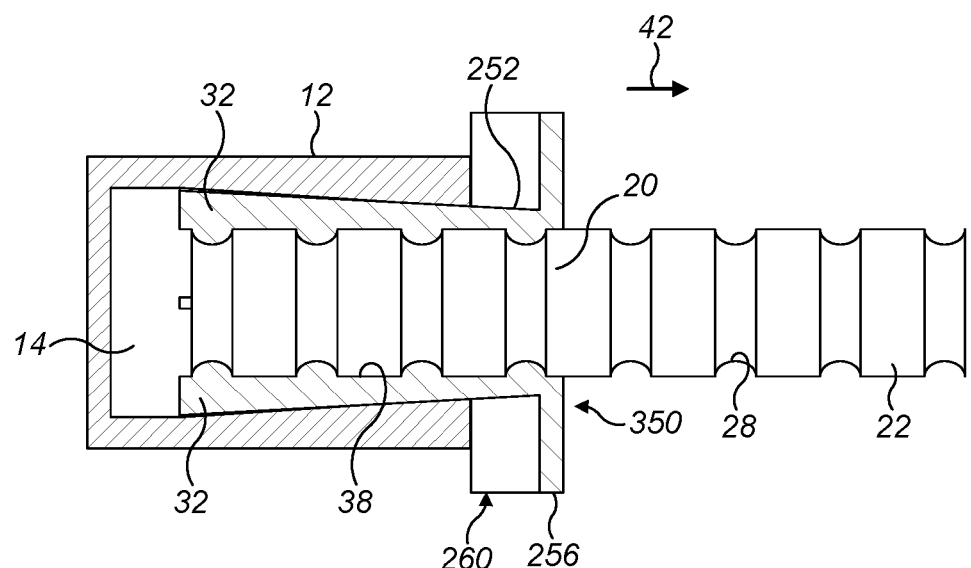

Referring to FIG. 31A, split wedge 350 is inserted into cavity 14 of body 12 through access opening 20 at smaller end 18 of cavity 14. To achieve insertion, force can be exerted upon contact surface 254 of flange 256, if required. However, parallel exterior sidewalls 352 and 354 on split wedge 350 make insertion easier Referring to FIG. 31B, member 22 is secured to body 12 by inserting first end 24 of member 22 through access opening 20 into cavity 14 of body 12. Wedge segments 32 of split wedge 350 are positioned circumferentially around member 22. Referring to FIG. 31C, as member 22 is inserted into split wedge 350 it engages interior sidewalls 356 and 358, with member 22 exerting a force to push outwardly until exterior sidewalls 352 and 354 are angled outwardly at thick end 34 of split wedge 350. Referring to FIG. 31D, split wedge 350 is then wedged in cavity 14 to maintain external profile 28 of member 22 engaged with internal profile 38 of wedge segments 32 of split wedge 350. This is accomplished by slowly pulling member 22 back toward access opening 20 as indicated by direction arrow 42. It is to be noted that split extension sleeve 252 projects through access opening 20 of cavity 14 when split wedge 350 is wedged in cavity 14 of body 12. Split wedge 350 is then maintained wedged in cavity 14 through the use of a retainer/spacer 260, that is inserted around member 22 between body 12 in the vicinity of access opening 20 and flange 256.

Referring to FIG. 32A through 32F there are a series of sequential side elevation views, in section, of the fastener assembly of FIG. 1A through FIG. 1H, incorporated into a beam clamp, which is generally indicated by reference numeral 400. It is to be noted that beam clamp 400 is used with a split wedge 250 having a flange 256 and an extension sleeve 252. Body 12 has a tapered cavity 14 that converges from a relatively larger end 16 to a relatively smaller end 18. An access opening 20 is positioned at smaller end 18 of cavity 14 to facilitate access to cavity 14. Referring to FIG. 32A, split wedge 250 is inserted into cavity 14 of body 12 of beam clamp 400 through access opening 20. Referring to FIG. 32B, flange 256 does not pass through access opening 20, as flange 256 serves as a stop. Referring to FIG. 32B and FIG. 32C member 22 is secured to body 12 by inserting first end 24 of member 22 through access opening 20 into cavity 14 of body 12. Referring to FIG. 32C and FIG. 32D, once wedge segments 32 of split wedge 250 are positioned circumferentially around member 22, split wedge 250 is then wedged in cavity 14 to maintain external profile 28 of member 22 engaged with internal profile 38 of wedge segments 32 of split wedge 250. Split wedge 250 is engaged by slowly pulling member 22 back toward access opening 20. Referring to FIG. 32D, it is to be noted that split extension sleeve 252 projects through access opening 20 of cavity 14 when split wedge 250 is wedged in cavity 14 of body 12. Referring to FIG. 32E, split wedge 250 is maintained wedged in cavity 14 through the use of a retainer/spacer 260, that is inserted around member 22 between body 12 in the vicinity of access opening 20 and flange 256. Referring to FIG. 32E, beam clamp 400 has an upper arm 402 and a lower arm 404. Upper arm 402 and lower arm 404 extending outwardly from body 12 perpendicular to cavity 14 to define a clamping space 406. A threaded opening 408 extends through lower arm 404 parallel to cavity 14. Referring to FIG. 32F, in order to make beam clamp 400 fully operational a screw clamp member 410 is engaged with threaded opening 408. As screw clamp member 410 is rotated it impinges into clamping space 406. Screw clamp member 410 is shown clamping a plate 412 against upper arm 402. A lock nut 414 is illustrated, but is not required for operation of beam clamp 400. Use of lock nut 414 is recommended where vibration or other environmental factors may otherwise result in a gradual lessening of the force exerted by screw clamp member 410 upon plate 412. FIG. 33 illustrates an alternative configuration of body 12 that may be used with some versions of beam clamp 400. Body 12 in this variation has back to back cavities, which are identified as 14A and 14B. This allows body 12 to connect with a member 22 positioned above, a member 22 positioned below or a member 22 positioned above and a member 22 positioned below. Parallels can be drawn between this variation of body 12 for beam clamp 400 and the linear connector previously described with reference to FIG. 16 and FIG. 16A. FIG. 34 illustrates a kit that includes body 12 of beam clamp 400, along with a plurality of split wedges of differing sizes, identified as split wedge 250A, split wedge 250B, and split wedge 250C. Depending upon the nature of the application, the diameter of member 22 that is to be used may vary. When beam clamp 400 is sold as a kit with differing sizes of split wedges, a range of diameters of member 22 can be accommodated.

Rail systems are sometimes used. For example, a pipe support that connects to a rail system is sold under the Trademark FLAMCO. Referring to FIG. 35A through 35C there are a series of sequential side elevation views, in section, of the fastener assembly of FIG. 1A through FIG. 1H, incorporated into a rail system which is generally indicated by reference numeral 450. It is to be noted that rail system 450 is another application which uses split wedge 250 with flange 256 and an extension sleeve 252. Rail system 450 has an elongated rail 452 which is best described as "C" channel. Rail 452 has an interior cavity 454 and inwardly directed flanges 456 that extend from the edges of rail 452 into interior cavity 454. Body 12 is in the form of a floating plate, which rests upon flanges 456. Member 22 is in the form of a castellated rod. Body 12 has a tapered cavity 14 that converges from a relatively larger end 16 to a relatively smaller end 18. An access opening 20 is positioned at smaller end 18 of cavity 14 to facilitate access to cavity 14. Referring to FIG. 35A, split wedge 250 is inserted into cavity 14 of body 12 through access opening 20. Flange 256 does not pass through access opening 20, as flange 256 serves as a stop. Referring to FIG. 35A and FIG. 35B member 22 is secured to body 12 by inserting first end 24 of member 22 through access opening 20 into cavity 14 of body 12. Once wedge segments 32 of split wedge 250 are positioned circumferentially around member 22, split wedge 250 is then wedged in cavity 14 to maintain external profile 28 of member 22 engaged with internal profile 38 of wedge segments 32 of split wedge 250. Split wedge 250 is engaged by slowly pulling member 22 back toward access opening 20. Referring to FIG. 35B, it is to be noted that split extension sleeve 252 projects through access opening 20 of cavity 14 when split wedge 250 is wedged in cavity 14 of body 12. Split wedge 250 is maintained wedged in cavity 14 through the use of a retainer/spacer 460, that is inserted around member 22 between body 12 in the vicinity of access opening 20 and flange 256. Referring to FIG. 36, retainer/spacer 460 has been given a unique identifier as it differs from other retainer/spacers that have been previously described. It is to be noted that retainer/spacer 460 is rectangular with long sides 462 and short sides 464. Referring to FIG. 35B, retainer/spacer 460 is initially engaged with member 22 with long sides 462 parallel to rail 452 and short sides transverse to rail 452. Referring to FIG. 35C, retainer/spacer 460 is then rotated so that short sides 464 are parallel to rail 452 and long sides 462 are transverse to rail 452. This results in retainer/spacer 460 engaging flanges 456 of rail 452 to prevent body 12 from moving upwardly into interior cavity 454 of rail 452.

It will be apparent from the foregoing examples, that member 22 can take a variety of forms as long as it has an external profile 28. There has been illustrated and described examples that use threaded rod having helical threads and castellated rod. It will also be apparent that, depending upon the application, second end 26 of member 22 can be modified. For example by the addition of a ball 302 for ball hitch 300, as described in relation to FIG. 29A through FIG. 29E. It will be apparent that there are a variety of split wedge configurations that may be used, depending upon the application. A first alternative split wedge configuration has been described that has a stop 33, a second alternative split wedge configuration has been described that has a sleeve extensions 252 with a flange 256, a third alternative split wedge configuration has been described that has a flexible hinge 322 joining adjacent side edges 324 and 326 of wedge segments 32 and a fourth alternative split wedge configuration has been described that has parallel exterior sidewalls 352 and 354 with inwardly tapered interior sidewalls 356 and 358. It will also be apparent that the form of body 12 may vary, as long as body 12 has a tapered cavity 14 having a relatively large end 16 and a relatively small end 18 with an access opening 20 at small end 18. It will finally be apparent that some form of securing element, such as a spacer/retainer 260, may be used to prevent separation of the components of the fastener assembly.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A fastener assembly, comprising:
a body defining a cavity that converges from a relatively larger end to a relatively smaller end, the body having an access opening positioned at the smaller end of the cavity;
an elongated member capable of insertion through the access opening into the cavity, the member having a first end, a second end and a circumferential external profile defined by a plurality of discrete, spaced apart, circumferential protrusions and a plurality of discrete, spaced apart, circumferential depressions, the external profile defining a plurality of arcuate surfaces;
a split wedge having two or more wedge segments, each of the wedge segments having a thick end, a thin end and an internal profile extending between the thick end and the thin end which is capable of engaging the external profile of the member, the internal profile defining a plurality of opposing arcuate surfaces complementary to the plurality of arcuate surfaces;
the member being secured to the body by inserting the member through the access opening into the cavity of the body, positioning the wedge segments of the split wedge circumferentially around the member, and then wedging the split wedge in the cavity to maintain the external profile of the member engaged with the internal profile of the wedge segments of the split wedge; and
a retainer engaging the body and the external profile of the member to prevent relative movement of the elongated member and the body, the retainer being positioned against the body adjacent the access opening.

2. The fastener assembly of claim 1, wherein the retainer is slotted to receive at least one protrusion of a plurality of spaced apart protrusions formed on the elongated member outside the cavity.

3. The fastener assembly of claim 1, wherein the split wedge is retained in the cavity without springs.

* * * * *